United States Patent
Kauders

(10) Patent No.: US 11,163,927 B1
(45) Date of Patent: Nov. 2, 2021

(54) COMPUTER SYSTEM FOR DESIGNING A PROCESS UNIT

(71) Applicant: CDE Consultants Limited, London (GB)

(72) Inventor: Peter Geoffrey Kauders, London (GB)

(73) Assignee: CDE CONSULTANTS LIMITED, London (GB)

( * ) Notice: Subject to any disclaimer, the term of this patent is extended or adjusted under 35 U.S.C. 154(b) by 0 days.

(21) Appl. No.: 17/060,909

(22) Filed: Oct. 1, 2020

(51) Int. Cl.
  *G06F 30/31* (2020.01)
  *G06F 30/3308* (2020.01)
  (Continued)

(52) U.S. Cl.
  CPC .............. *G06F 30/31* (2020.01); *G06F 30/17* (2020.01); *G06F 30/18* (2020.01);
  (Continued)

(58) Field of Classification Search
  CPC ...... G06F 30/31; G06F 30/18; G06F 30/3308; G06F 30/17; G06F 30/28; G06F 2113/08; G06F 2113/14; G06F 2115/10
  (Continued)

(56) References Cited

U.S. PATENT DOCUMENTS 7,013,248 B1 * 3/2006 Todini ..................... G05B 15/02
                                                       703/2

FOREIGN PATENT DOCUMENTS

| WO | WO-9003618 A1 * | 4/1990 | ............. G06F 30/18 |
| WO | WO-2011133805 A2 * | 10/2011 | ............. G06F 30/13 |

OTHER PUBLICATIONS

Yang, Yin et al., "Study on the Numerical Simulation of Heat Transfer Performance for Multi-Channel Tubes Based on Fluid-Solid Coupled", 2011, 10th International Symposium on Distributed Computing and Applications to Business, Engineering and Science, IEEE. (Year: 2011).*

(Continued)

*Primary Examiner* — Cedric Johnson
(74) *Attorney, Agent, or Firm* — Thomas Horstemeyer, LLP

(57) ABSTRACT

A computer system for designing a process unit, the process unit comprising a set of unit operations interconnected by streams. The computer system comprises a stream generator (process simulator) configured to simulate the process unit by modelling the set of unit operations and flow conditions of each of the streams that interconnect the unit operations within the process unit. The stream generator generates physical properties of each of the streams based on their respective generated flow conditions. The computer system further comprises a stream engineering properties module configured to determine stream engineering properties of each of the streams based on their respective flow conditions and generated physical properties. The stream engineering properties define engineering requirements of each of the streams. The computer system further comprises a preliminary engineering system configured to determine engineering information based on the determined stream engineering properties, physical properties of each of the streams and flow conditions of each of the streams, wherein the engineering information comprises: equipment engineering data for each of the unit operations and pipe engineering data for each of the streams. The computer system is configured to design the process unit based on interactively integrating the engineering information with the determined stream engineering properties, flow conditions and generated physical properties of the streams through information channels formed by each stream interconnection between a pair of unit operations.

20 Claims, 7 Drawing Sheets

(51) Int. Cl.
    *G06F 30/17*    (2020.01)
    *G06F 30/18*    (2020.01)
    *G06F 115/10*    (2020.01)
    *G06F 30/28*    (2020.01)
    *G06F 113/08*    (2020.01)
    *G06F 113/14*    (2020.01)

(52) U.S. Cl.
    CPC .......... *G06F 30/3308* (2020.01); *G06F 30/28* (2020.01); *G06F 2113/08* (2020.01); *G06F 2113/14* (2020.01); *G06F 2115/10* (2020.01)

(58) Field of Classification Search
    USPC ........................................................ 703/9, 6
    See application file for complete search history.

(56) References Cited

OTHER PUBLICATIONS

Sun, Xiadong et al., "The Development of an INL Capability for High Temperature Flow, Heat Transfer, and Thermal Energy Storage with Applications in Advanced Small Modular Reactors, High Temperature Heat Exchangers, Hybrid Energy Systems, and Dynamic Grid Energy Storage Concepts", Oct. 2014. (Year: 2014).*

J. Madden et al. "Plant layout—untouched by human hand?" The Chemical Engineer, May 24, 1990.

* cited by examiner

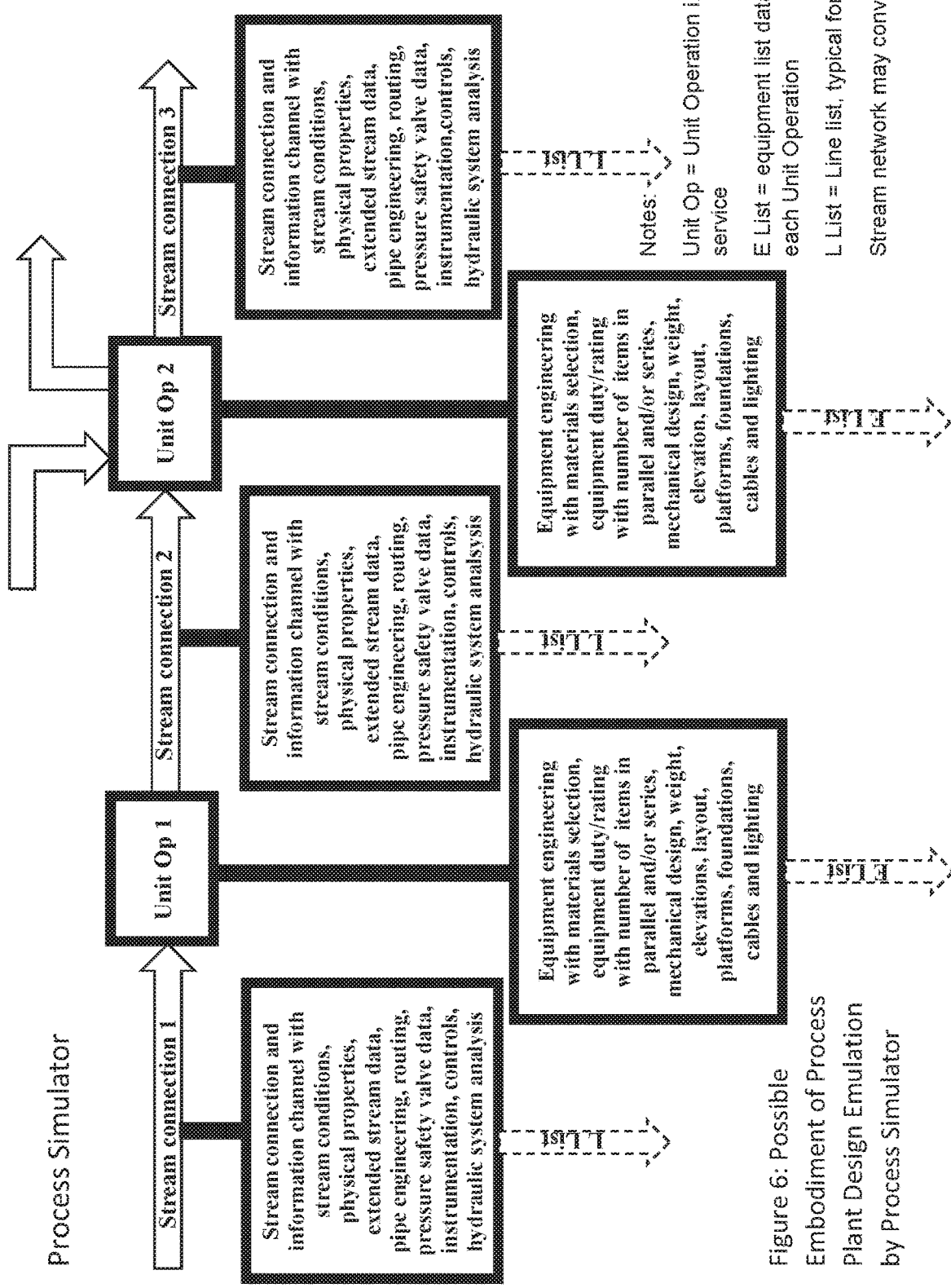
Figure 6: Possible Embodiment of Process Plant Design Emulation by Process Simulator

COMPUTER SYSTEM FOR DESIGNING A PROCESS UNIT

FIELD OF INVENTION

The present invention relates to a computer system and a computerized method of carrying out the design of a process unit, in particular, a computerized method of carrying out the design of a process unit comprising a set of unit operations, in which each unit operation entails a process step that is carried out by equipment such as a distillation column, heat exchanger, reactor, separator or pump.

BACKGROUND

Advances in computing technology, as well as improvements in thermodynamics, equation-of-state models and the prediction of physical properties, have led to more accurate and sophisticated process simulation models being developed for the simulation of processes in the oil, gas and chemical industries. A process simulation model defines the unit operations and their sequence needed to implement a process scheme or flowsheet, and also the streams flowing between the unit operations. The stream and the unit operation concepts are fundamental to the science and practice of chemical engineering. In solving the flowsheet the process simulation program maintains certain basic principles, such as conservation of mass and energy at each unit operation, whilst maintaining equilibrium between phases if more than one phase is present, such as occurs in phase separators or distillation columns.

The term 'unit operation' is often used interchangeably with 'equipment', although some types of equipment such as filters and furnace fans may not be modelled in the process simulator at all, and the actual number of engineered items of equipment is unknown. In process simulation models each unit operation is represented by an equipment model of the total stream flow and/or total energy (heat/power) duty i.e. a single item of equipment.

Typically, these process simulation models determine the steady state flow conditions of mass and molar flow rate, composition, phase, pressure and temperature, for each stream in the process, from which physical properties such as thermal capacity and thermal conductivity can be determined, as well as the heat loads and other requirements for designing the unit operations that constitute the process. For instance, process simulators size distillation column trays and packed columns, and provide stream data for the design of heat exchangers and phase separators, and the shaft power required for pumps, compressors and turbines. However, this data has then to be developed by an engineering team into a front end engineering design (FEED) that takes account of the equipment, process control, layout and hydraulic aspects of design, before detailed engineering and construction can be started. In other words, the data generated by such process simulation models requires further input to provide an in-depth engineering design of a process unit.

Presently, FEED is undertaken by a multi-discipline group of engineers using their own specialist computer programs and knowhow, wherein these design activities have to be coordinated by a management team to ensure that they are taken in the right sequence and that technical consistency is achieved and the design requirements met. The FEED design step, sometimes called Conceptual Design, usually takes 6 to 12 months depending upon the complexity of the task and the scope of work, in the course of which many engineering diagrams and drawings of various types are produced, from which the material quantities can be determined and a construction cost estimate produced. Since the technical outcome of the FEED design is difficult to foresee in detail, there are risks of failing to meet some critical objective set out at the beginning of a project, such as fitting all the equipment into the available space on the site, which event may require extensive re-work of the design, or missing opportunities for significant design improvements altogether. Crucially, process simulators are unable to carry out the plant layout. Mechanical equipment design is also not possible, as process simulators are unable to undertake hydraulic design, or to make a preliminary materials selection upon which permitted design stress values depend. Although the number of shells needed in parallel and/or series for a heat exchanger duty can be determined by a thermal design program, there is no way of meeting the corresponding design need for other equipment types, such as reactors, fired heaters, pumps, compressors, dryers and filters. These diverse engineering tasks are simply not possible within a process simulator, as they may require specialist knowledge and even policy input from the owner(s).

There have also been attempts to ensure design consistency through the use of engineering databases, although these have not necessarily led to any significant reduction in the effort required or time needed. The use of costly 3D-modelling has also been attempted at the FEED stage, rather than more conventionally in the subsequent detailed engineering step. As accurate sizing data for the equipment is normally developed during FEED, and may involve obtaining information from equipment supply companies, there is a significant risk of inefficient working and re-work with premature use of 3D-modelling, so the benefit of its use at such an early design stage is not clear.

FIG. 1 shows a known solution 2 applied in the engineering design for the oil and gas, gas processing, refining and petrochemical industries. Such known engineering design comprises process simulation model 10 and engineering database 12. Note that the functions of engineering database 12 now to be described are still carried out in many organizations in a traditional, manual way, as human beings are capable of organizing their work in a consistent manner. In use, a user inputs design basis information and design criteria 14 to initiate process simulations, which are typically carried out in the process simulation model 10, and the simulation model results are sent to the engineering database 12. The engineering database 12 contains process stream data and the results of engineering calculations 16, and may be linked to piping and instrumentation drawings (P&IDs) 15 and 3D piping model 17. More specifically, the engineering database 12 obtains its data from multiple sources, in order to output data sheets and reports 18 that contain lists of equipment, lines and valves as required for the process. Therefore, in a fully integrated design incorporating the results of calculations from different engineering programs, a change to even one process parameter alone, such as unit capacity, cannot easily be followed through the entire design process e.g. heat exchanger design programs 19. For example, each of the design programs may be interlinked with process simulators 10, but they do not automatically update the layout in the 3D piping model 17 during simulation. Thus the consequences of thermal design and selection of heat exchanger type cannot be properly evaluated in the context of complete unit design. The complex engineering work process requires careful planning, and it is only possible for the team to develop in detail a single, preferred design solution, with the client approving each design document that is produced at each step in the work. Detailed investigation of alternative designs is infeasible. Furthermore, extensive human intervention is needed to carry out many design tasks, for example:

thermal and mechanical design of heat exchangers and air coolers;

selecting the materials needed for each unit operation and each interconnecting pipe;

determining the number of pieces of equipment needed e.g. two or more operating pumps may be required to meet the flow requirement in addition to a standby, and then carrying out the rating (setting design margins and other design criteria) and mechanical design of the equipment;

assigning the correct fluid service to each pipe, then determining the piping pressure class for the service conditions;

determining what instrumentation and controls are needed, then drawing the piping & instrumentation diagrams (P&IDs);

positioning each piece of equipment, or deciding how to route a pipe, in a 3D model;

quantifying the materials needed to construct the process unit.

Since these design tasks are commonly carried out in multiple computing environments and programs, the emphasis in recent development in the field has been focused on creating collaborative data management systems, such as those described in U.S. Pat. Nos. 7,367,018 and 8,818,935. Automating and optimizing fully, even for one aspect of the design, plant layout, as described in International patent application with publication No. WO1990/003618, is exceedingly complex and, indeed, creating any engineering drawing based system is an inherently slow process.

Various attempts have also been made to improve the capabilities of process simulators, such as that disclosed in International patent application with publication No. WO2011/133805, which considers the problems arising from limited data, and that described in European patent application with publication No. EP3031013, which considers multiple design cases arising from time dependent changes such as reservoir depletion or the variation in catalyst performance in hydrotreating. However, neither WO2011/133805 nor EP3031013 tackles the engineering steps following the process simulation step, and how they may affect the design outcome.

Process simulators often solve a process flowsheet by a sequential modular solution technique starting with the feed stream(s) to the unit, and solving each of the unit operations encountered in turn. The product stream(s) from one unit operation become the feed stream(s) to the downstream unit operations. When a pump or compressor is encountered, the modeller has to make an informed guess of the discharge pressure, otherwise the program stops and data for unit operations and streams downstream cannot be generated. This problem can be solved accurately in the FEED stage by an engineer undertaking hydraulic design. It does not have to be solved in the process simulator, as stream composition is unaffected, only the hydraulic pressure and hence the mechanical design pressure for all affected equipment and piping. In contrast, the pressures set in a separator or at the top or bottom of a distillation column are crucial, as they affect stream compositions, and cannot be changed in subsequent engineering.

Therefore, subsequent engineering tasks not only include determining the actual number of items of equipment, the metallurgy, plant layout and carrying out hydraulic design, but ascertaining which of the process simulation results (data items) cannot be changed, and which are only advisory and may be changed. This is easy enough for a trained engineer to decide, but more difficult to program an engineering database to determine in his place.

The possibility of undertaking these complex engineering tasks from either the stream data produced by a process simulator or directly by the process simulator itself is described in this application.

SUMMARY OF INVENTION

Process simulators model the unit operations in a process unit and create the stream data for the heat and material balance. However, such simulation software does not provide engineering information for the plant design, such as the materials of construction, the number of items of equipment (operating and standby) needed for each unit operation, the layout of the process unit, P&ID data, and the design of auxiliary equipment, such as filters, coalescers, and compressor suction guard separators, that are required in-between the simulated unit operations, but are not normally modelled in the process simulator.

More recently, the technique of Conceptual Design Emulation (CDE) was introduced to the processing community, which focusses on how to speed up process plant design modelling by using a logic driven system to mimic the decision making steps undertaken in the design process such as FEED. The arrangement of FIG. 2 is similar in many respects to that of FIG. 1 and corresponding features have been given the same reference numerals. FIG. 2 shows the known Conceptual Design Emulation 4 of using a single engineering model 20, i.e. CDE mathematical model and database for process and mechanical equipment design, also holding information on the project design criteria, P&ID content, layout and materials in one place. A known process simulation model 10 creates a heat and material balance for a process unit, and this data is then matched in a simple 'stream generator' within the CDE mathematical model 20. The stream generator is capable of being scaled according to the feed capacity of the process unit without re-running the process simulator. This is similar to using stored values of product yields and utility demands (expressed in tonne/tonne of feed) and energy use (MJ/tonne of feed) which underpin the technique of linear programming.

The output from the stream generator may then be used for equipment sizing (e.g. sizing of heat exchangers provided that the overall heat transfer coefficient is known, or distillation column height and diameter, if the tray count and sizing are known), setting the equipment mechanical design conditions from the process stream conditions, determining the wall thickness and weight for each item of equipment, provided that the metallurgy and the number of items of equipment are known and specified for each unit operation. Each unit operation may be assigned a number of layout parameters, for example which side of the spinal pipe rack it is to be located, whether it is to be located with another item, and a sequence number, the coordinates are then calculated for the centroid of each unit operation, from which the piping and cable runs can be established. As in process simulation 10, each unit operation has connections, upstream and downstream, to other unit operations, or to the unit battery limit for an incoming or an outgoing stream. The material selection entered for each unit operation is then used for the piping downstream, although this can lead to error in some cases i.e. a manual check is then needed for the material of each interconnecting pipe.

In addition, instrumentation and control needs are determined by logical analysis. Piping details such as vent and drain connections, and utility hose stations are added automatically. CDE automates the piping and instrumentation detail of a process unit, and enables preparation of a bill of materials (material take-off or MTO), both time consuming tasks in conventional engineering. As a CDE database requires much manual data entry, templates have been built for common process flowsheets such as gas treating amine units, refinery hydrotreater units, and refinery crude and vacuum distillation units in order to reduce modelling time.

In essence, CDE mathematical model and database 20 as shown in FIG. 2 complements the results of a process simulator 10, in that it generates the preliminary equipment, piping and instrument engineering design from a process simulation model in a timely and responsive manner and it can be used to evaluate each desired process scheme. More specifically, CDE mathematical model and database 20 facilitates an automated interaction between the engineering database 12 and engineering calculations 16, 3D piping model 18, equipment design and other design decisions as shown in the known solution 2 of FIG. 1. Runtime for such modelling technique is measured in seconds, as the technique does not require the production of drawings or 3D models, thus allowing many ideas and designs to be tested quickly, including the evaluation of their consequences for plant layout and cost. Consistency of engineering design is improved, as all engineering design data is held and engineering calculations take place in a single computer program. CDE was envisaged as a means of replacing traditional cost estimating methods, which require extensive statistical data for relevant processes and sites. In contrast, CDE is a deterministic, preliminary engineering program, and requires no prior knowledge of the process, the site, or project statistics, as everything is determined or modelled (entered) anew. CDE also demonstrates that most preliminary engineering design, other than heat exchanger thermal design, column sizing and compressor rating, only requires knowledge of the mass flow, pressure, temperature and density of the process streams.

However, the lack of a process simulation capability in the prior art conceptual design emulation technique, especially the lack of any capability for distillation column tray design and heat exchanger thermal design, held back its development, in particular understanding the barriers to develop the use of existing process simulators to initiate and perform FEED e.g. integration of heat exchanger thermal design 19 between process simulation and layout had not been possible. However, a thermal design capability is provided in CDE based on its own internally generated stream data, allowing the number of heat exchanger shells and size to be determined from a TEMA type and stream data much like a conventional thermal design program. Furthermore, certain key steps are missing from or not automated in CDE, such as basic material selection for equipment and piping, the determination of the number of duty and standby pieces of equipment, which affects the plant layout, automatic setting of equipment layout parameters (the method in CDE is laborious), the identification of hydraulic systems, and the resulting determination of hydraulic pressure profiles (for accurate rating of compressors and pumps, and for setting the mechanical design pressure of such systems), just as these steps are absent from process simulation.

For example, Conceptual Design Emulation requires the materials of construction and number of pieces for each item of equipment (other than heat exchanger shells) to be entered manually, as is the pipe function used to determine the pipe routing. Other drawbacks to this system are the inability to determine the pressure profile in a rigorous manner, so that pump and compressor differentials have still to be set manually, as they are in a process simulator by specifying the discharge pressure at the pump or compressor There were problems in the modelling of auxiliaries, such as fans and air pre-heaters for fired heaters, as a reliable way of relating a major piece of equipment to its auxiliaries had not been found. The possibility of generating design reports was foreseen, and of optimising the design to minimise the space needed and/or the cost of building the process unit. There is no intention either in CDE or its successor Process Plant Design Emulation (PPDE) to replace engineering, which is a consultative and necessarily slow process, with its need to create drawings of each aspect of a process plant, viz. process flow, material selection, piping and instrumentation, conceptual layout (plot plans), and electrical one line diagrams, to name some of those produced during FEED. However, the more accurate results that could be obtained from PPDE in pre-FEED studies, create the opportunity to minimize the time and cost of the FEED stage, whilst optimizing the engineered design through lower investment and operating costs, and reducing risks in engineering design and procurement.

The present applicant has mitigated the above problem of improving the accuracy and speed of industrial process design, by providing a computer system for the preliminary engineering design of a process unit, the process unit comprising a set of unit operations interconnected by streams, the computer system comprising: a stream generator, which may be a process simulator, which simulates the process unit by modelling the set of unit operations and flow conditions of each of the streams that interconnect the unit operations within the process unit; and wherein the stream generator generates physical properties for each of the streams based on their respective flow conditions, a stream engineering properties module which determines stream engineering properties of each of the streams based on their respective flow conditions and generated physical properties, wherein stream engineering properties define engineering requirements of each of the streams; a preliminary engineering system which determines engineering information based on the stream engineering properties, physical properties and flow conditions of each of the streams, wherein the engineering information comprises: equipment engineering data for each of the unit operations and pipe engineering data for each of the streams; and wherein the computer system is configured to design the process unit based on interactively integrating the engineering information with the determined stream engineering properties, flow conditions and generated physical properties of the streams through information channels formed by the stream interconnections between the unit operations.

The practical meaning of integrating the engineering information in this way often simply means determining the consequences of a particular decision. For example, if two operating pumps are needed rather than one to fulfill a particular duty, there will be an increase in the footprint of the unit operation, and all other items further along the unit have to shuffle along, to make room for the extra item of equipment, leading to many changes in piping and cable runs, more concrete paving and many other minor changes. The program evaluates these changes in a consistent and interactive manner. There is no 'feedback' loop into the change from 1 to 2 operating pumps and so no iterative calculation.

More specifically, recognizing the importance of the interface between process simulation and FEED, and building on Conceptual Design Emulation, examples of the present disclosure are directed towards Process Plant Design Emulation (PPDE), in which the functions of a process simulator are combined with an enhanced version of Conceptual Design Emulation. That is, starting from a process simulation model of the process unit, the combined functions of process simulation and preliminary engineering design are carried out in a single system. At its heart are the interconnections between the unit operations that make up the process unit, or in other words streams in the process simulation model. These streams are similar to those depicted in a process flow diagram (PFD) drawn up to illustrate the arrangement of the unit operations and streams in the process unit. The same interconnections (or streams) are also shown on piping and instrumentation diagrams (P&ID) drawn up in the FEED design stage but with more details. For example, in P&I diagrams the connections represent pipes and are shown with additional information such as a fluid service, size, material and pressure class. Similarly, in the present method of PPDE, every interconnection between unit operations combines three functions: a stream, a pipe and an information channel. Each of the three functions carries crucial design information resulting from engineering modelling. For example, the stream function conveys flow conditions and physical properties in each of the streams, as determined by process simulation. In addition in PPDE, the stream function also conveys stream engineering properties that define engineering requirements of the respective stream.

The pipe function provides pipe engineering data based on the stream engineering properties, flow conditions and physical properties of each of the streams, such as the sizing of interconnecting pipes and nozzles for items of equipment, with this information then being included in equipment weights through the information channels. Every pipe section and its associated valves and piping components is automatically sized and assigned the correct material group and pressure class, so that accurate reports of material quantities can be generated.

The information channels formed by the stream connections between the unit operations allow the computer system to engineer the process unit by interactively exchanging information of any kind between connected unit operations, viz. stream conditions, stream physical properties, stream engineering properties, equipment and pipe design information. For example, the information channel allows the computer system interactively (1) to determine the sequencing and spacing required between the differing unit operations (items of equipment) in plan directly from the process flow sequence and other engineering considerations, such as whether a pump is outboard (or inboard) of the drum from which it draws liquid and so does not need to be included in the sequence, or whether a particular type of equipment (such as a fired heater) has to be located at a safe distance from other items, normally at the end of the unit, (2) to determine the spacing where necessary in elevation so that, for example, the Net Positive Suction Head (NPSH) required by a pump to avoid cavitation is used to set the elevation of the drum connected to the pump suction and the NPSH is itself determined in conjunction with the pump speed, the number of stages and the impeller diameter based upon hydraulic analysis of the pumped system, (3) to determine corrosion rates and/or the acceptability of possible materials of construction for a stream and so to determine a suitable material of construction for the pipe, and then to convey this information to the connected equipment upstream and/or downstream where account can also be taken of possible materials of construction for equipment manufacture, leading to the determination of a suitable material of construction for each unit operation, (4) to determine the purpose or function of each piping interconnection, such as a pump or compressor suction, recycle, or discharge, vapor overhead line from a distillation column or separator, fired heater transfer line, other process connection, utility connection or utility ringmain, and accordingly how the pipe is to be routed, and to determine other engineering aspects of the connection (such as whether a control valve, flowmeter, pressure safety valve, check valve or maintenance block valve is required), and (5) to classify the entire network of unit operations and pipes in the process unit by hydraulic system, which leads to the calculation of the hydraulic pressures at the discharge of pumps and compressors and also the pressures at the 'Battery Limits' of the process unit i.e. for all the incoming lines to and outgoing lines from the said unit, such hydraulic pressures being separate from the stream pressures set in the process simulation model, and which automatically override the stream pressures if these are not determined to be crucial for the process simulation model itself.

The computer system further comprises a store of unit operation models (i.e. equipment models), each model is formed by as many equations as necessary for determining the engineering data of both a qualitative and quantitative nature for the design of each of the unit operations of the process unit depending upon the selected equipment type (e.g. 'centrifugal' for a pump), wherein the engineering data for each unit operation includes the basic materials of construction needed, taking account of the process stream conditions and the material requirements for the connected pipes; the rated process capacity or duty determined from the process simulation model inclusive of a design margin from the project criteria, the applicable sizing criteria and equations according to the unit operation and its selected equipment type, the number of operating items of equipment in parallel and/or series needed to meet the overall process capacity or duty of each unit operation; the head requirements for pumps and compressors determined by hydraulic analysis, the mechanical design conditions of pressure and temperature, taking account of the stream information of the connected streams and analysis of the hydraulic system within which the unit operation falls; and the dimensions and elevation for each item of equipment; the dry, operating and hydraulic test weights of the items of equipment; whether a standby item of equipment is required; the preliminary foundation size for each item of equipment; whether an electric motor drive is required for an item of machinery and if so its rating; the footprint (space occupied) and location determined by a layout module for each unit operation from the number of items of equipment and their dimensions; and wherein the computer system further comprises a store of engineering rules, wherein one or more of the engineering rules is applied to determine engineering data.

For example, whilst the PPDE computer system models the unit operations, setting the design capacity, establishing the mechanical design conditions from the conditions of the connected streams and the determined hydraulic pressures, dimensioning each in turn, and in the course of which it determines the number of items of equipment operating in parallel and series needed to meet the process duty, the engineering rules allow the computer system to determine how these results are obtained, for example:

(1) the margin to be established between stream operating pressure and maximum operating pressure, taking account of the action of the plant pressure controller; and the margin to be applied between the maximum operating pressure and the design pressure, which may be a policy set by the owner or by an applicable design code;

(2) the capacity margins and sizing criteria to be set for each unit operation and, if appropriate, equipment type;

(3) the sparing policy to be adopted for each unit operation;

(4) the maximum suction specific speed for a centrifugal pump, affecting the relationship between capacity, motor speed, and NPSH required;

(5) the safe spacing rules between items of equipment of the same type and of different type, and between equipment and the pipe rack, all according to equipment type, which are used in the layout module to determine a footprint for each unit operation and to determine the location of each according to the required sequences.

The various steps in the engineering design process are thereby automated, expediting study of the consequences of changing a process parameter, such as feed capacity, feed composition or other process stream composition, the process arrangement (process flow diagram), the type of equipment (such as substituting a plate type heat exchanger for a shell and tube type), a change in site conditions (such as the air temperature for air cooler design), or a change in layout concept, or in a design policy.

The computer system herein termed Process Plant Design Emulation (PPDE) therefore embraces and integrates many of the functions carried out by process simulators, thermal design programs, front end engineering database, P&ID database, 3D layout, engineering calculations, cost estimating and supply chain planning programs, thereby facilitating true plant optimisation and at the same time reducing risk in both design and procurement.

The stream generator is further configured to determine the flow conditions and physical properties of the one or more outlet streams from each of the unit operations from the one or more inlet streams to each unit operation, based on their respective unit operation models from the store, whereby a heat and material balance is maintained over each unit operation whilst maintaining equilibrium between phases if more than one phase is present, and wherein the respective one or more inlet streams to each of the unit operations are either the one or more feed streams to the process unit or one or more output streams of a preceding unit operation in the process unit. The stream generator is further configured to simulate the process unit by creating a heat and material balance for the said process unit.

The flow conditions of each of the streams comprise one of more of: mass flow rate, molar flow rate, volumetric flow rate, temperature, pressure, phase, composition and molecular weight. The critical properties may also be determined for the stream, which may then be used to determine the physical properties. The physical properties comprise one or more of: specific heat, latent heat, density, viscosity, thermal conductivity, surface tension of each of the streams, and for each phase if more than one phase is present.

The stream engineering properties further comprise one or more of: corrosion rate model, requirements for material of construction, stream fouling factor, Reynolds number, Nusselt number, heat transfer coefficients, fluid hazard classification, and the identification of connected unit operations, so as to define engineering requirements in each of the streams.

The pipe engineering data determined from the preliminary engineering system defines attributes of a pipe conveying each of the streams, and wherein the pipe engineering data takes account of the number of items of equipment, forming the unit operations connected upstream and downstream. The pipe engineering data further comprises one or more of: pipe size, material of pipe construction, pipe wall thickness, piping pressure class, pipe purpose and routing, and coordinates of starting point and termination points for each of the pipes. Pipes herein may have a circular cross section or a rectangular cross section, such as a duct, for example, for conveying air flow. Optionally, the pipe engineering data further comprises insulation type and thickness, and painting, and any instrumentation, meters, control valves, pressure relief valves, or valves for maintenance, flow diversion, throttling or backflow prevention needed for each pipe.

The equipment engineering data determined from the preliminary engineering system for each of the unit operations in the process unit and for its pre-selected equipment type further comprises one or more of: equipment type, material of construction, equipment rating and sizing criteria, heat exchanger designation such as a TEMA heat exchanger designation, mechanical design conditions of pressure and temperature, mechanical design with sizing, weights, and foundation size, listing and sizing of connections, number of operating and standby items of equipment required for each of the unit operations Optionally, the equipment type and major equipment auxiliaries may be determined automatically and not pre-selected. The equipment engineering data further comprises any electric motors, with their ratings and cable sizes.

The computer system further comprises a process layout module for calculating a footprint and/or an elevation of each of the unit operations based on the engineering information, wherein calculating the footprint takes account of the number of items of equipment and wherein the process layout module determines the location of each of the unit operations with respect to a pipe rack of the process unit, and the process layout module is configured to calculate the overall area occupied by the process unit from the engineering information. Optionally, the process layout module determines one or more layout sequence of unit operations. Optionally, the calculated layout parameters are part of the equipment engineering data.

The process layout module further determines a piping route for each interconnecting pipe according to its purpose, which is either directly by the shortest route or along the pipe rack within the process unit. Optionally, information may be determined on the elevation and routing of pipes conveying each of the streams in the process unit. Optionally, such pipe routing information is part of the pipe engineering data.

The process unit comprises one or more hydraulic systems each formed from one or more unit operations and their interconnecting pipes, and wherein the preliminary engineering system is configured to identify the extent of the hydraulic system and to determine, for each of the hydraulic systems, a method of determining a hydraulic pressure profile. For example, a hydraulic system can be shared amongst a couple of connected unit operations, e.g. pump and multiple heat exchangers. A process unit may have a several hydraulic systems linking the unit operations, in series and, where the flowsheet diverges (e.g the vapor and liquid streams leaving a separator), in parallel.

The method of determining the hydraulic pressure profile starts at the first unit operation and towards the last unit operation in each of the hydraulic systems, if the pressure is fixed in the first unit operation e.g. a separator pressure or a battery limit pressure for a feed line. Alternatively, the method of determining the hydraulic pressure profile starts at the last unit operation and towards the first unit operation in each of the hydraulic systems, if the first unit operation is a pump or compressor, or the pressure is fixed by the process in the last unit operation or it is a battery limit pressure for a product line. The direction of calculation is automatically decided by information about the first and/or last unit operation conveyed through the information channels within the hydraulic system.

The hydraulic pressure profiles of each of the hydraulic systems determine a differential pressure across each of the unit operations in the respective hydraulic system, wherein the preliminary engineering system is configured to determine engineering information such as the mechanical design pressure based on the differential pressure across each of the unit operations in addition to the generated flow conditions and generated physical properties.

Optionally, the process unit may combine several processes together, which are integrated within one physical area containing a common battery limit, for example a crude distillation unit and its associated vacuum distillation unit may be combined into a single process, and the refinery sour water stripper may also be included in the same physical area.

Optionally, part of the process unit may be configured in parallel trains of equipment, as can happen in a hydrocracker process, matching any such arrangement within a process simulator, but with separate identities for each unit operation in the parallel trains. The trains are identical in process simulation terms, but may have different layout coordinates, according to the required layout practice.

In another aspect of the present disclosure, there is provided a computerized method for designing a process unit, the process unit comprising a set of unit operations interconnected by streams, the computerized method comprising: i) simulating the process unit by modelling the set of unit operations and flow conditions of each of the streams that interconnect the unit operations within the process unit; and generating physical properties of each of the streams based on their respective flow conditions; ii) determining stream engineering properties of each of the streams based on their respective flow conditions and generated physical properties, wherein stream engineering properties define engineering requirements of each of the streams; iii) determining engineering information, based on the determined stream engineering properties, physical properties of each of the streams and flow conditions of each of the streams, the engineering information comprising: equipment engineering data for each of the unit operations and pipe engineering data for each of the interconnecting streams; and iv) designing the process unit based on interactively integrating, over the available information channels within the process unit, the engineering information with the determined stream engineering properties, flow conditions and generated physical properties of the streams.

In another aspect of the present disclosure, there is provided a process unit designed using the computerized method as described herein.

The system and method for carrying out process and preliminary engineering design together in a single computer program, may be described in more detail including one or more of the following features:

a process simulation capability (which may be a template) for a group of processes, such as refinery distillation, hydro-treating, or gas treating, with an accuracy that is acceptable for engineering purposes, leading to the generation of a heat and material balance for the process unit, and physical properties for each process stream, which are then used for engineering calculations, but in which the stream data is extended as described below;

extending the stream data for engineering needs (a) to create a thermal design capability, by generating stream fouling factors and heat transfer coefficients for various heat exchanger design purposes at a reference velocity and dimension, and (b) to include a fluid service indicator, corrosion rate model, and basic material selection according to the stream properties and type of process, and (c) to identify the unit operations to which the stream is connected, upstream and/or downstream;

using the extended (i.e. engineering) stream data for the sizing of heat exchangers and for the material selection of each stream in the process unit and also as an input to the material selection for each unit operation, which may require a different material according to equipment type e.g. 316SS for the plates in some plate heat exchangers;

establishing the mechanical design conditions of pressure and temperature, design capacity, size and weight for each unit operation from the stream conditions and a designated set of rules, and for each unit operation or general category of process equipment (and where appropriate equipment type), determining the number of duty and standby pieces of equipment, based on practical engineering limitations on the process capacity, physical size, weight or other technical parameter for the equipment type; and determining the size and preliminary mechanical design of each piping connection needed between the unit operations in the process flowsheet, including establishing the pressure class for the material selected at the required operating conditions of pressure and temperature, based on the stream flow conditions, the determined hydraulic pressure profile, the stream physical properties and a designated set of rules, and determining whether the pipe interconnection is to be run directly by the shortest route, or along the pipe rack within the process unit;

using the resulting calculation of the number of pieces of equipment and their size to establish the overall size of the process unit, the location (including elevation) of each item of equipment and the sizes of the various connections, termed 'piping leads' by practitioners in the art, and then to determine the length of piping runs between connected items of equipment, according to their routing and location;

for each item of equipment determining the connected nozzles (other than for machinery, which are manufacturer specific), including service connections, instrument connections and manways, and their resulting weight, determining the spacing required between the various unit operations (items of equipment) in plan, and where necessary in elevation;

for the interconnecting piping running along the pipe rack within the process unit, including headers carrying utilities supplied from outside the process unit, determining the number of levels needed to accommodate the said piping on the pipe rack as well as static dry, operating and test loads at intervals along the pipe rack, including any supported equipment such as air coolers, of sufficient accuracy for preliminary engineering design of the pipe rack structure;

setting up a 'battery limits' table defining the ingoing and outgoing process and utility lines for the process unit, together with designated operating pressures and temperatures, and assigning a hydraulic system identity to every piping interconnection within the process unit based upon key pressures either in the process simulation, viz. flash separation, column top tray, reflux drum etc., or in the 'battery limits' table itself, viz. utility supply conditions of pressure and temperature, or the pressure in a process feed line from or rundown line to storage, or the adjacent process unit in the processing complex;

determining for each hydraulic system the direction in which the pressure profile should be calculated, viz. for a pump (or compressor), or outgoing process or utility line, the pressure at the downstream end of the hydraulic system is used as the starting point, and the pressures are then determined in an upstream direction until the pump (or compressor), or other key pressure in the process simulation is reached, whereas for a vapor or liquid line from a process separator or distillation column, the equilibrium flash pressure set in the process simulator is the starting point and the pressures are then determined in a downstream direction until a pump (or compressor), or other key pressure in the process simulation is reached. The determination of the 'pressure profile' for each hydraulic system may then override values of stream pressure previously set in the process simulation, provided these are not key flash separation or column conditions as described in the foregoing paragraph, and the hydraulically correct pressure profile is used to determine the pressure class of the piping components within each hydraulic system;

from the aforesaid hydraulic pressure profiles, setting the differential pressures for the pumps, compressors, turbo-expanders and steam turbines, from which the correct machinery parameters (e.g. speed and impeller diameter for a centrifugal pump) and shaft power can be determined;

where items of equipment require electric motors, using the aforesaid shaft power and lengths of cable from the position of the equipment to the motor control centre (MCC) or electrical sub-station located at a safe distance from the process unit specified in the project data to determine the cable diameter needed to meet a required voltage drop from the MCC to the motor in question; and creating design reports in list format for equipment, piping, instrumentation and control, safety, layout data and structural loads in sufficient detail to define the starting point for FEED, and the expected outcome from FEED in terms of lists of equipment, other significant components and bulk materials by size, weight, material group or other criteria.

In an aspect of the present disclosure, there is provided a computer system for designing a process unit in the oil, gas and chemical industries: the process unit comprising a set of unit operations interconnected by streams, the computer system comprising: any means of generating a heat and material balance for a process unit, which may be a process simulator or other stream generator, in which flow conditions of mass flow, composition, molar vapour fraction, phase, pressure and temperature are determined, or specified if appropriate, for each of the streams in the process unit, and the critical properties and thermal/physical properties of each of the streams, which may comprise one or more of specific heat, latent heat, density, viscosity, thermal conductivity and surface tension are determined from their respective flow conditions, a means of determining stream engineering properties of each of the streams based on their respective flow conditions and, where appropriate, physical properties, wherein stream engineering properties define engineering requirements of each of the streams; a preliminary engineering system to determine engineering information based on the stream flow conditions, critical properties, physical properties and engineering properties, and other input data which comprise a store of engineering rules, catalogue information and design basis criteria, wherein the engineering information comprises: equipment engineering data for each of the unit operations in the process flowsheet, including physical dimensions and the determination of the layout coordinates for each unit operation and the number of pieces of equipment both duty and standby for each unit operation, with their associated electric cables, and design allowances for structures and foundations, and/or pipe engineering data for each of the streams, and the necessary controls, instrumentation, and safety equipment; and wherein the streams interconnecting the unit operations become a network of information channels for transmitting engineering information of any kind between one or more unit operations, and the unit operations themselves may also pass engineering information forward from an inlet to an outlet stream, or backwards from an outlet stream to an inlet stream, and wherein the computer system is configured to design the process unit by integrating the engineering information for each unit operation with the determined flow conditions, critical properties, physical properties and stream engineering properties of the connected streams, and with the engineering information of other unit operations connected upstream or downstream over as many information channels as necessary for each design purpose.

The computer system further comprises an input defining one or more feed streams to the process unit, wherein the unit operations are connected to each other by one or more inlet streams and one or more outlet streams, and an output wherein the computer system generates one or more product streams from the process unit.

The stream generator is configured to determine the flow conditions of the one or more outlet streams and/or inlet streams for each of the unit operations, based on their respective unit operation models from the store, wherein the inlet stream(s) for each of the unit operations is the one or more output streams from a preceding unit operation in the process flowsheet of the process unit.

The stream engineering properties further comprise one or more of: corrosion rate model, requirements for materials of construction, stream fouling factor, normalized Reynolds number, normalized Nusselt number, and normalized heat transfer coefficients for both the tube side and shell side of shell and tube heat exchangers, and normalized heat transfer coefficients for plate heat exchangers, where normalized means that the number or coefficient has been evaluated at a reference velocity (or, optionally, a reference mass flow) and reference dimension for the purpose of carrying out single phase heat transfer and condensing heat transfer calculations, and wherein the stream engineering properties include the heat duty for a pair of streams (i.e. inlet/outlet) at any heat exchanger, air cooler or fired heater, the numbered position inside a column of a feed tray or draw tray stream, the identification of the fluid service (also known as the piping commodity), the fluid hazard classification, and the identification of the unit operations connected upstream and downstream, so as to define engineering requirements in each of the streams, which requirements may also apply to the unit operations to which each stream is connected.

The computer system further comprises a store of unit operation models, each model being formed by equations, which may also depend upon the selected equipment type, for determining engineering information for the unit operation in question, such as its maximum or rated operating flow conditions and mechanical design conditions, overall physical dimensions, weight, and its utility requirements, such as shaft power or a heat duty; and wherein the computer system further comprises a store of engineering rules, catalogue information and design basis criteria, such as design margins, wherein one or more of the engineering rules together with the catalogue information and design basis criteria are applied as necessary to determine the engineering information for each unit operation, including the determination of the number of duty and standby pieces of equipment for each unit operation, based on practical limitations on the process capacity or physical size or weight or other technical parameter for each category of equipment and operational needs, determining technical parameters such as the TEMA designation and tube length for a shell and tube heat exchanger, and carrying out heat exchanger thermal design, sizing of piping nozzles for the items of equipment, determining maintenance requirements such as the number and size of manways, and determining insulation requirements such as the purpose (heat conservation, personnel protection, or cold conservation) and estimated thickness of insulation.

The equipment engineering information is used to determine dry, operating and test loads applicable to the preliminary design of equipment foundations, and wherein the equipment engineering information is used to determine a preliminary estimated foundation size and/or weight, and a preliminary size and/or estimated weight of the structural steel needed for access platforms, shelters or other structures associated with the equipment concerned.

The equipment engineering information includes tabulated minimum spacing data between each type of equipment (or unit operation), and between each type of equipment and the unit pipe rack, and wherein there is a system for designating which side of the unit pipe rack each type of equipment is normally located, which types or categories of equipment have to be located adjacent to the pipe rack, and which types of equipment may be positioned inboard/outboard of another type such that the space occupied along the pipe rack is as short as is practicable, and the sequence in which such positioning is to be carried out, provided that the overall width of the process unit is not adversely affected, and wherein the system determines which unit operations (items of equipment) are to be located nearest (adjacent) to the pipe rack, all of which comprises equipment engineering information.

The computer system further comprises a process layout module for calculating a footprint and/or an elevation of each of the unit operations based on the equipment engineering information, and the process layout module is configured to calculate from the engineering information the location of each of the unit operations within the process unit and the overall area occupied by the process unit.

The layout sequences of unit operations on each side of the pipe rack are specified within or determined by the process layout module.

Optionally, all the aforementioned equipment engineering data including layout information defines attributes of the unit operation concerned, and may be termed extended unit operation parameters.

The process layout module determines the coordinates of the starting point and termination points of each of the pipes, and the pipe routing is determined for each pipe interconnecting a pair of unit operations, the determined routing being either along the unit pipe rack or directly between the connected unit operations according to the function of the pipe itself.

The pipe engineering data determined from the preliminary engineering system defines attributes of a pipe conveying each of the streams, wherein the pipe engineering data comprises one or more of: pipe size (nominal bore), material of pipe construction, pipe wall thickness or schedule, pressure class, pipe insulation thickness, and wherein the number and size of the connections upstream and downstream (known as piping leads) is determined from the number of items of equipment needed for each connected unit operation.

The number of levels of pipework needed at any independently variable points on the unit pipe rack is determined from the diameter of the pipes running past each of the aforesaid points, the thickness of insulation for each pipe, and the pipe rack design criteria, which include the pipe rack width, the minimum spacing between pipes, and the percent free space all specified in the design basis criteria.

The process layout module further determines the length of the unit pipe rack, its height and the supported dry, operating and test loads at a minimum of three independently variable points along the unit pipe rack.

The preliminary engineering system contains a process control module which determines the need for a flow meter, control valve, emergency shutdown valve, blowdown valve, pressure relief valve installation, process transmitter and/or instrument for measuring and controlling flow, pressure, temperature, level and/or switch for activating a pump and/or shutdown device, and wherein preliminary engineering system determines the diameter and pipe run for each flowmeter, the type and size of each control valve, the size of each emergency shutdown valve, the number and size of pressure relief valves for each pressure relief valve installation, and the I/O count of digital and analogue signals for the distributed control system (DCS).

The process unit further comprises one or more hydraulic systems each formed from one or more unit operations, and wherein the preliminary engineering system is configured to determine, for each of the hydraulic systems, a method of determining a hydraulic pressure profile.

The method of determining the hydraulic pressure profile in a hydraulic system starts from the first unit operation and towards the last unit operation or alternatively from the last unit operation and towards the first unit operation, according to the characteristics of that hydraulic system communicated through the information channels.

The hydraulic pressure profiles of each of the hydraulic systems further defines/includes a differential pressure across each of the unit operations in the respective hydraulic system, wherein the preliminary engineering system is configured to determine engineering information (such as a pump or compressor differential and discharge pressure, or the pressure drop across a control valve) based on the differential pressure, which may be specified in the design basis or calculated in the unit operations module, across each of the unit operations in addition to the flow conditions.

Optionally, all the aforementioned, determined stream information, pipe engineering data, hydraulic information and process control information defines attributes of each of the stream interconnections between the unit operations, and may be termed extended stream parameters.

Optionally, the process layout module further determines the number of lighting circuits for the process unit, and wherein the engineering information determines the type, number and rating of luminaires for the unit operations, access ways, piping and instrumentation within the area of each lighting circuit.

Optionally, the computer system further generates the length, size and voltage rating of electric cables for the electric motors, heaters and lighting circuits within the process unit.

Optionally, a section of the process unit may be split into parallel trains e.g. the number of heat exchange trains for a reactor feed/effluent exchanger in a hydrotreater may be matched to the number of heater passes to ensure equal distribution of the combined oil feed and hydrogen stream to the reactor feed heater.

Optionally, more than one process may be modelled within a single processing area.

Optionally, the PPDE modelling system may be used for the design of a power plant, tank farm, effluent plant or other unit that may be required for a complete processing facility.

Optionally, the PPDE modelling system may be used for revamp design in which an existing process unit is to be modified for a change in feedstock, product requirements, higher capacity or other economically beneficial purpose.

Optionally, the PPDE modelling system may be used for the design of process units constructed in modules.

Optionally, an engineering design report is automatically generated, the engineering design report comprising one or more of a sized equipment list with equipment duty, type, design conditions, materials of construction, dimensions, and estimated weight and cost, a piping line list, a valve report line by line, a battery limits list, a control valve list including emergency shutdown and blowdown valves, a list of electrical cables, a listing of equipment with location information and estimated foundation size and steel quantities, detailed design reports for particular categories of equipment such as heat exchangers, and detailed reports of material quantities of piping and valves by material, pressure class and diameter.

In another aspect of the present disclosure, there is provided a stream engineering properties module.

In another aspect of the present disclosure, there is provided a computerized method for designing a process unit, the process unit comprising a set of unit operations interconnected by streams, the computerized method comprising: i) simulating the process by modelling the set of unit operations and flow conditions of each of the streams that interconnect the unit operations within the process unit; generating physical properties of each of the streams from their flow conditions; ii) determining stream engineering properties of each of the streams based on their flow conditions and generated physical properties, wherein stream engineering properties define engineering requirements of each of the streams; iii) determining engineering information, based on the determined stream engineering properties, stream physical properties and flow conditions the engineering information comprising: equipment engineering data of each of the unit operations and/or pipe engineering data of each of the streams; and iv) designing the process unit by interactively exchanging engineering information of any kind between connected unit operations through an information channel formed by the stream connection between a pair of unit operations.

In another aspect of the present disclosure, there is provided a process unit designed using the computerized method.

Arrangements are described in more detail below and take the form of a computer system for designing a process unit, the process unit comprises a set of unit operations interconnected by streams. The computer system comprises a stream generator configured to simulate the process by generating the flow conditions for each of the streams that interconnect the unit operations within the process unit. The stream generator determines physical properties of each of the streams based on their flow conditions. The computer system further comprises a stream engineering properties module, which determines stream engineering properties of each of the streams based on their flow conditions and physical properties. The stream engineering properties define engineering requirements of each of the streams. The computer system further comprises a preliminary engineering system which determines engineering information based on the determined stream engineering properties, stream physical properties and flow conditions: the engineering information comprising equipment engineering data for each of the unit operations and/or pipe engineering data for each of the streams. The computer system is configured to design the process unit by interactively exchanging engineering information of any kind between connected unit operations through an information channel formed by the stream connection between a pair of unit operations.

BRIEF DESCRIPTION OF THE DRAWINGS

The invention will be described in more detail, by way of example, with reference to the accompanying drawings, in which:

FIG. 6 is a schematic diagram illustrating an embodiment of the present invention in which an existing process simulator can be modified to carry out the functions of Process Plant Design Emulation and should be read in conjunction with FIG. 4.

The arrangements of FIGS. 1 to 6 are similar in some respects to each other and like features have been given like reference numerals.

DETAILED DESCRIPTION OF THE INVENTION

Figure 1:
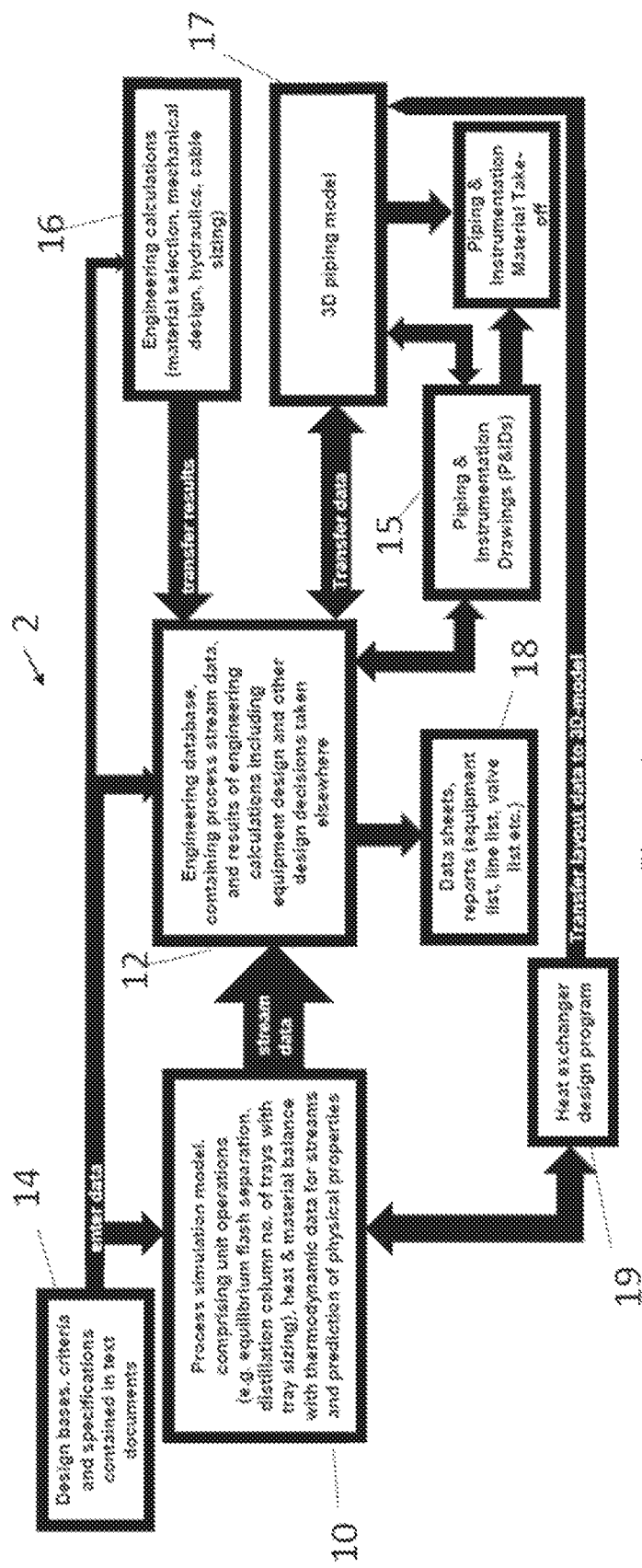
FIG. 1 is a flow chart illustrating a known approach to process plant design.
Figure 2:
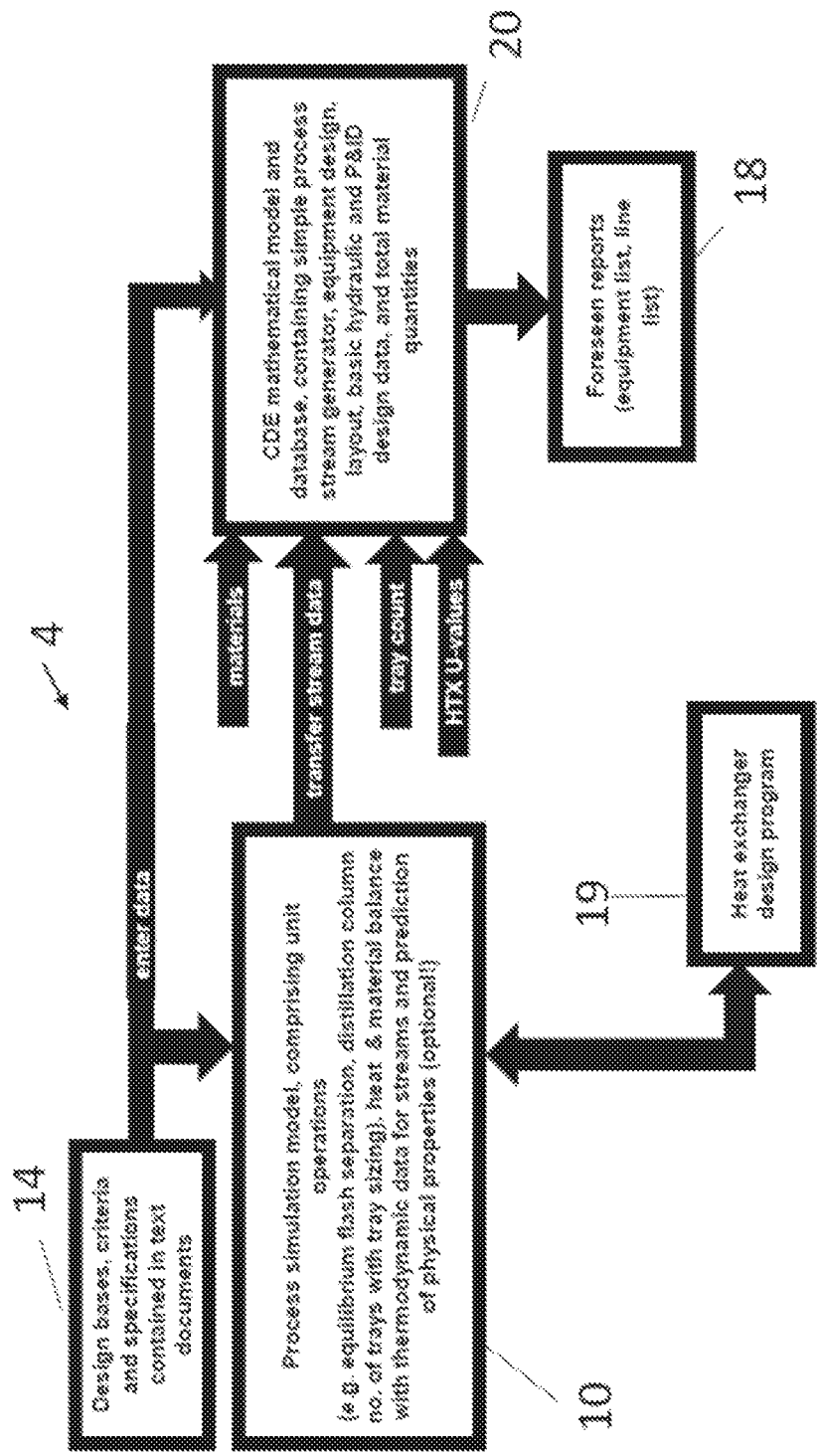
FIG. 2 is a flow chart illustrating a method of process plant design according to a known technique of Conceptual Design Emulation.
Figure 3:
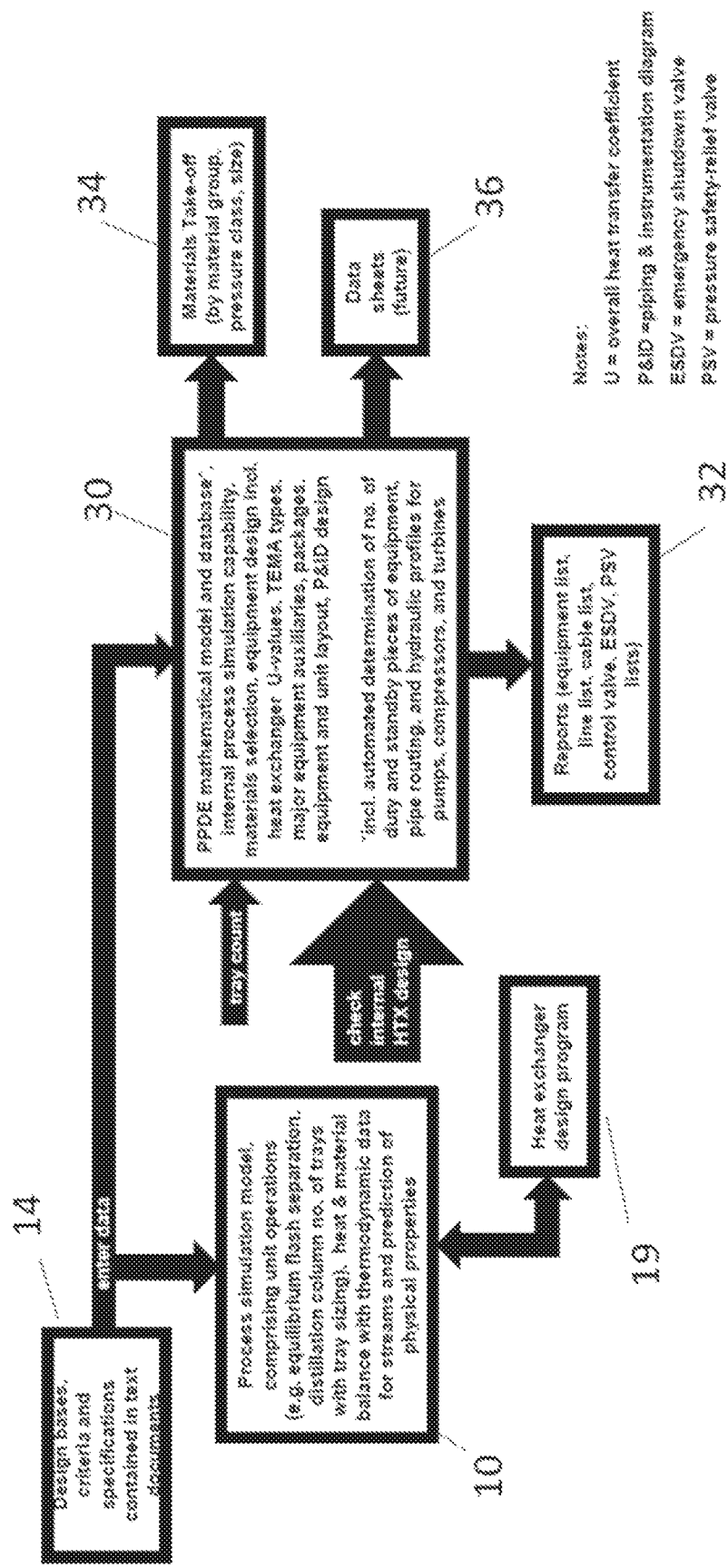
FIG. 3 is a flow chart illustrating a method of process plant design used in Process Plant Design Emulation embodying an aspect of the present invention.

An example of a computer system and computerized method embodying an aspect of the present invention will now be described with reference to the flow chart in FIG. 3, which relates to the technique of Process Plant Design Emulation (PPDE). As shown in FIG. 3, the technique of PPDE differs from the prior art technique of Conceptual Design Emulation (CDE) as shown in FIG. 2, in that the process simulation model 10 is integrated with a PPDE mathematical model and database 30, which enables the automated selection of materials, automated process and mechanical design of equipment, automated process unit layout, and automated design of the piping and instrumentation content that is normally shown on P&I diagrams. Reference may be made to FIG. 6. In CDE the stream generation and the equipment engineering from unit operations are two distinct steps, whereas in PPDE they may be executed in a single structure. In addition, the introduction of information channels in PPDE has facilitated development of capabilities in automated materials selection, automatic determination of the number of items of equipment, automated layout, and hydraulic design which are absent from CDE, and also eliminates the need to maintain separate templates for individual processes.

In use, a user first enters 14 design bases, criteria and specification data for the project, which may be contained in text documents, into a number of stores or pages in the PPDE mathematical model and database 30, organised according to whether the information is specific to the process unit or common for different processes in a single project. A small part of this data is also needed for the process simulation model 10. The PPDE mathematical model and database 30 may then undertake design decisions, engineering calculations, and modelling using its own internal process simulation capability, which has been checked against the independent process simulator 10 for each of the unit operations, key stream data and key physical properties. The output of the PPDE model may be one or more of a) reports comprising lists of required equipment 32, e.g. equipment list, line list, cable list, control valve list, emergency shut down valve list and pressure safety-relief valve list, b) material take-off 34 defining parameters such as material group, pressure class and size, and c) data sheets 36, if required (n.b. the information conveyed in the reports item a) should be sufficient to obviate the need to generate data sheets). Note that no drawings are produced, as this step would be both time consuming and expensive. The objective of PPDE, the process design emulation program, is to emulate i.e. equal the content or result of the FEED stage for a process unit without incurring the usual time and cost.

The PPDE database 30 also contains typical catalogue information for various commonly occurring unit operations (equipment categories), and standard piping, instrumentation and cable data, which is drawn upon as necessary by the PPDE mathematical model. This catalogue information is available for any project and any process unit and is capable of being expanded.

The internal process simulation capability 30 may be referred to as a stream generator. It is configured to generate the heat and material balance for the process unit, comprising the flow conditions of mass flow, pressure, temperature and composition for each of the streams that interconnect the unit operations needed for the unit; wherein the stream generator generates critical properties and physical properties of each of the streams based on their respective flow conditions. More specifically, the process simulation model simulates the unit operations and the streams flowing between the unit operations. This internal process simulation model contains the list of unit operations and their connected streams, in the same way that the process simulation model 10 contains unit operations and connected streams.

The internal process simulation model 30 may be developed from one or more templates appropriate to a group of processes, such as refinery crude and vacuum distillation, thermal processing, or distillate hydro-processing that have previously been checked against an independent process simulation model 10 in order to reduce modelling time. Refinery processes are designed for one or more specific feed cases, each case with its own assay based on the yield and physical properties at so-called cut points along the True Boiling Point (TBP) curve of the feed stream with fractionation of the products the common step. Processes with reactors, whether thermal or hydro-processing type, are similarly characterised by a product yield pattern and associated physical properties organised by a series of TBP (cut point) temperatures, which information for hydro-processing is normally available from the catalyst supplier. As liquids are the main products in refinery processes, such assays or product yield patterns are accurate enough for preliminary engineering needs around the main fractionation column (in the case of a crude unit) or the product fractionator (such as in the case of a hydro-processing unit), and are used to generate the heat and material balance, stream physical properties and stream engineering properties.

The flowsheet structure In the case of distillate hydro-processing comprises feed drum and pumps, reactor feed/effluent exchanger, heater, reactor, final product cooling, separation (always including a cold HP separator), and fractionation. The number of product fractionator trays specified in the independent process simulation model 10 is also used in the PPDE model 30. The conditions in the cold HP separator govern the composition of the hydrogen rich recycle gas stream and therefore the PPDE simulation capability includes this key flash separation, and requires tabulated data or a predictive method for the relevant equilibrium k-values. The PPDE process simulator emulates the independent process simulator 10.

The flowsheet structure in the case of a crude distillation unit comprises a feed pump and crude pre-heat train with desalter and one or two pre-flash stages before a fired heater. The gas released in the pre-flash stages raises the bubble point temperature of the crude oil, which allows it to be heated at moderate pressures without vaporising, which is beneficial to the operation of the heat exchangers in the crude pre-heat train. These flash steps also affect the flow and heat duty at the fired heater. The PPDE process simulator emulates the independent process simulator 10 through use of equilibrium k-values at the pre-flash separators calculated either by the Wilson or vapour pressure method. The overall material balance for the unit is determined from the crude assay directly, which is of sufficient accuracy for preliminary engineering design of the entire crude distillation unit.

The hot crude oil enters the flash zone of the main fractionator and is separated into products according to the feed assay, required cut point temperatures, and the liquid side draw flows to the product strippers, typically producing kerosene, light gas oil and heavy gas oil. The residue flows to the stripper at the bottom of the main fractionator. The total number of trays in the main fractionator and stripper is typically around 40 and the side strippers contain 4 to 6 trays. Again the trays counts are entered into the PPDE model with the tray spacing, otherwise the PPDE model sizes the trays and determines the size of any transition pieces needed in the main fractionator to accommodate different diameters. Stripping steam flows are calculated from a default value of 10 lbs/barrel, and may be overwritten.

The number of trays or stages and reflux ratio needed for the fractionator in each process is well known to practitioners in the art, and so does not have to be independently modelled in a PPDE simulation, if these parameters are not being optimised. In some other cases, the user may modify the model for a particular process, or create models for new processes or bespoke processes by matching the results from the independent process simulation model 10.

In petrochemical processes such as thermal cracking of ethane, naphtha and gas oil or catalytic dehydrogenation of propane or butane a yield pattern approach can also be used to set up the overall material balance, and fractionation train design based on tray counts and reflux ratios known to practitioners in the art. Similarly, in gas processing, component recoveries are usually targeted for plant design purposes and can be used for establishing an overall material balance. Flash separation of light components can be estimated from equilibrium k-values determined from tables, pure component vapour pressure, or the Wilson method without the need for much more complex equation of state methods, which are in any case available in the independent process simulator 10.

The PPDE mathematical model and database 30 comprises a stream engineering properties module configured to determine stream engineering properties of each of the streams based on their respective flow condition and physical properties as generated by the internal process simulator, wherein stream engineering properties define engineering requirements of each of the streams, e.g. the specific requirement of a particular stream in terms of:

corrosion rate model, requirements in material of construction, stream fouling factor, normalized Reynolds number, Nusselt number, and heat transfer coefficients at a default velocity and dimension, and the identification of connected unit operations for each stream.

The PPDE mathematical model and database 30 further comprises a preliminary engineering system configured to determine engineering information based on the determined stream engineering properties, wherein the engineering information comprises: equipment engineering data of each of the unit operations and pipe engineering data of each of the streams.

Engineering calculations, modelling and selection may be carried out by one or more interlinked 'expert systems', automatically and reactively to changes in process stream information within the PPDE model 30, which is impossible with the independent heat exchanger design program 19. For example, when the user implements a change in the design basis, the internal process simulator outputs a different simulation result. Since the unit operations are interconnected by one or more information channels, the stream engineering properties module and the preliminary engineering system in the PPDE mathematic model automatically reprocess the updated simulation result, thus providing a time and cost efficient modelling environment.

Taking heat exchanger design as an example, the modelling capability in PPDE extends beyond merely determining the duty of heat exchangers. Instead the stream engineering properties module determines the engineering properties of a fluid stream taking into account the stream conditions, and enables the user to test different heat exchanger types (e.g. shell and tube, or plate and shell) and determine an engineered design for each service as well as the engineered size and cost of the resulting process unit in the two cases.

Furthermore, the PPDE mathematical model and database 30 contains a series of expert systems which are interlinked to automate the entire engineering design process starting from the heat and material balance and the determined physical and engineering properties for each stream. These expert systems cover the selection of materials of construction for equipment and piping, configuration of equipment type, such as TEMA types for shell and tube heat exchangers and number of tube passes, high or low theta plates for a plate heat exchanger, fractionation column overall height, horizontal or vertical separator orientation, possible machinery solutions etc., determining the number of duty and standby items of equipment for each unit operation in the process, equipment layout, pipe routing determined from the function (or purpose) of each piping interconnection, and determination of the hydraulic system for each unit operation (equipment item) and pipe section in the process unit. Once the hydraulic system is defined, the pressure differential as required may then found for each pump and compressor service in the envisaged process flowsheet. Building on this, the shaft power may then be calculated for each item of process machinery, and motor ratings established, from which the required cable sizes can be found.

The stream engineering properties of each of the streams may be extended to include one or more of normalized heat transfer coefficients, a fluid service indicator and preliminary material appropriate to the stream conditions. For example, in the case of a crude distillation unit, sulphur attack on steel is the main concern in the pre-heat train, and the rate of attack depends upon the sulphur content of the process stream and its operating temperature, as described by the McConomy curves for alloys of differing chromium content. By increasing the chromium content of the steel, an acceptable corrosion rate can be determined for each stream and hence item of equipment n.b. in a hydro-treating process, the Nelson curves would be used in addition to the McConomy curves. The expert system is capable of being extended into other processing areas.

In the field of exploration and gas processing where a wet gas stream may contain carbon dioxide, its corrosivity may be determined by the method of deWaard and Milliams or similar, and consideration of the effectiveness of injected corrosion inhibitors could allow the more extensive use of carbon steel. In a dry gas system, however, the service temperature is the main factor in determining a suitable material of construction i.e. impact tested carbon steel may be suitable for service down to −45° C. or −50° C., depending upon the applicable materials testing regime. Lower service temperatures may require the use of Ni steels or stainless steel depending upon owner preference as well as technical factors.

As with known process simulation, the unit operations in the process flow scheme for the process unit have to be identified i.e. listed, and the type of equipment specified. Each unit operation is then assigned a unique internal number (which does not have to be consecutive), independent of the plant numbering system, which is then used to identify its auxiliary items, and to start equipment sizing calculations according to the aforementioned method, using an assigned stream or streams (two streams, one being the working fluid and the other being the heat or cooling source, are needed for most heat exchangers). In the modelling environment, where multiple items are discovered for a unit operation, sub-letters or labels may be attached with reference to the said unit operation, e.g. P-11A/B for a duty and standby pump for unit operation P-11. Once multiple items are found for a particular unit operation, the piping leads to and from the items are automatically created. These lead lines normally have the same material and pressure class generated for the main interconnection between the unit operations, but are sized differently according to the number in operation (i.e. excluding connections to standby pumps). The weights of the connected nozzles are included in the calculated equipment weights, along with the necessary manways, level bridle and service connections.

Package items and major equipment auxiliaries, such as furnace fans, air pre-heaters and other heat recovery exchangers, are all sized and designed in a similar way, but some duties are related to the major equipment that they serve. In the PPDE modelling environment, this relationship is simply identified by embedding the tag number of the major item into the name of the auxiliary e.g. H-01 Induced Draft Fan for heater, H-01.

The same principle of matching material and pressure class applies to the piping trim at equipment, such as level bridles and service connections, to vent and drain lines, and to control valve and pressure relief valve piping. API spring loaded pressure relief valves are the default standard applied in the program. The pressure relief valves are automatically selected according to the pressure rating and temperature in each of the lines and the various cases determined by an expert system for each installation.

The unit operations in the internal process simulation model within the PPDE mathematical model and database 30 are in communication with each other in an interactive manner through the information channels formed by the stream interconnections between the unit operations, therefore a change in process parameters or design decision, for example varying the unit throughput capacity, utility condition, site condition, or project requirement, may then automatically propagate throughout the process and mechanical design of the process unit. In some embodiments, the layout sequence may be checked to confirm if there is an optimal use of the space, e.g. optimal arranging of equipment and unit operations on both sides of the unit pipe rack. For example, the user may evaluate different heat exchanger options, such as replacing shell and tube heat exchangers with a more compact plate heat exchangers in the modelling environment.

In the modelling environment, each model is constructed with a 'Process Unit' page, allowing key technical parameters (e.g. unit feed capacity) to be studied without having to delve into the model workings. Extensive design reports (technical lists with pertinent data) are automatically generated and updated. Material reports of pipe by size, material group and schedule, and of valves by these parameters plus a basic function, block, check and globe (throttling) valves, can be extracted from the underlying model by running macros.

Figure 4:
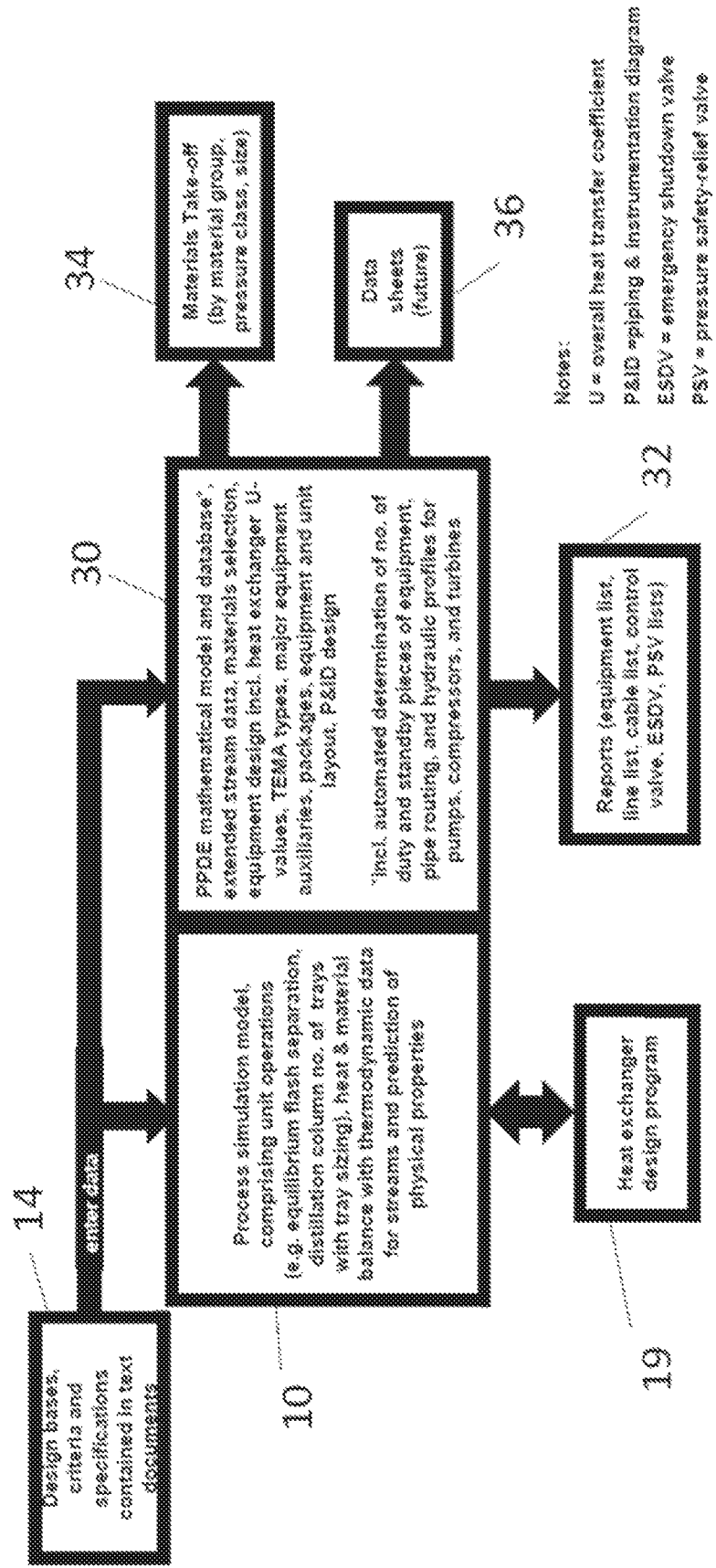
FIG. 4 is a flow chart illustrating a method of process plant design by retrofitting existing process simulation models to Process Plant Design Emulation, embodying an aspect of the present invention.

FIG. 4 shows how an existing commercial process simulator could be developed to have the functions and capabilities of PPDE. That is, retrofitting a commercial process simulator with the PPDE mathematical model and database 30, e.g. by building a PPDE capability into an existing process simulator, or by providing an interactive link between the two programs. This arrangement would facilitate the application of process simulators to a wider front end engineering design (FEED), although without a drawing capability. Essentially, the computer system that is shown in FIG. 4 functions in the same manner as the one illustrated in FIG. 3. The only difference is that the process simulation model 10 is a commercial process simulator that is capable of communicating with the PPDE mathematical model and database 30. In particular, in this embodiment the interconnection between a pair of unit operations formed by a process stream becomes the information channel to convey the hydraulic and layout information necessary to carry out engineering functions within a process simulator.

The interconnections become the repositories for stream data, pipe engineering data, hydraulic information and control system data, whereas the unit operations become the repositories for the equipment engineering data including layout information. FIG. 6b shows the program structure to achieve this and the need to maintain separate flowsheet templates is thereby eliminated.

Figure 5A:
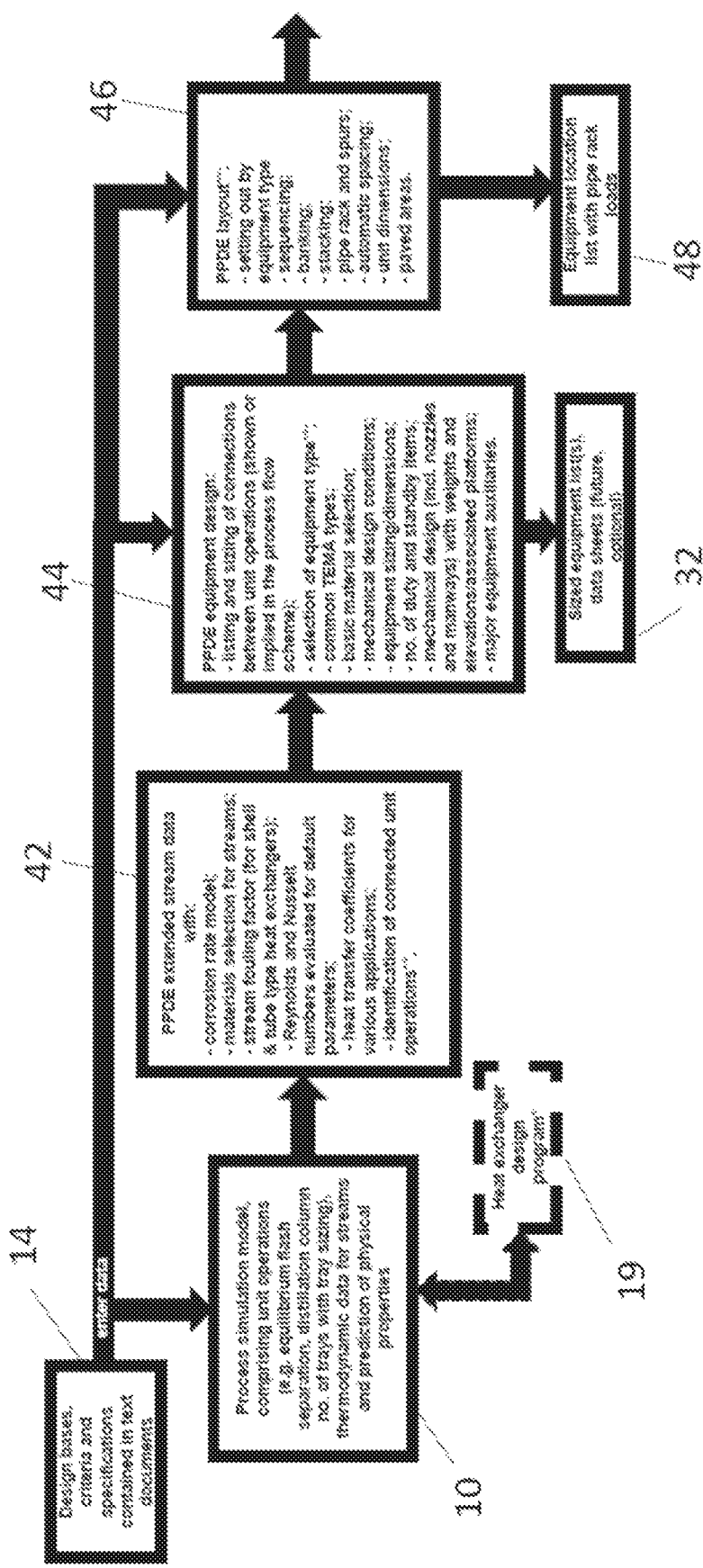
FIGS. 5a and 5b are flow charts illustrating the method of process plant design as depicted in FIG. 3 in greater detail.
Figure 5B:
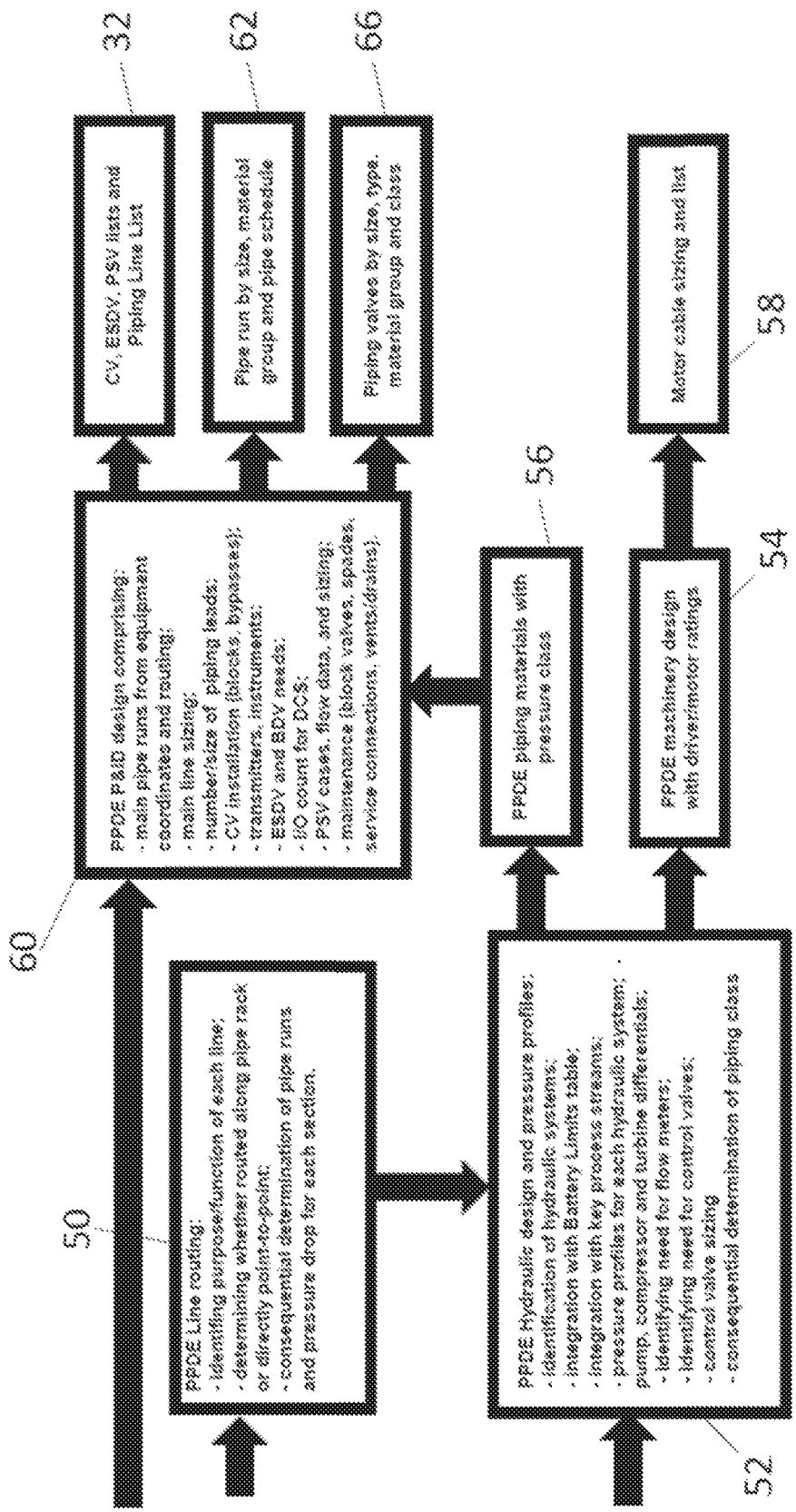

FIGS. 5a and 5b show, in more detail, the steps and considerations in the PPDE mathematical model and database 30 as shown in FIGS. 3 and 4. FIG. 5a and FIG. 5b shows the method for PPDE in two parts.

The first part of PPDE as shown in FIG. 5a provides a set of extended stream data, or stream engineering properties, in order to resolve the main interfaces between process simulation and process plant design, by extending the concept of stream data into four areas, viz.: (1) modelling corrosion rates for each stream, whereby a preliminary material selection becomes possible, (2) determining normalized heat transfer coefficients for various applications, (3) determining or reporting tray number, spacing, and type for key trays in each section of a distillation column, as well as a means of identifying the column type (e.g. main fractionator, or stripper), and (4) identification of the connected unit operations.

The second part of PPDE as shown in FIG. 5b shows the critical layout 44 and hydraulic design aspects.

The corrosion model for modelling corrosion rates has to be appropriate to the group of processes under study, e.g. refinery distillation, hydro-processing, gas processing and petrochemicals, syngas etc. In addition to the corrosion model, a standard table may be used to specify the materials required for utilities irrespective of process. That is, the standard table selects the materials required based on the stream conditions. Since the connected equipment may be manufactured from materials differing from that required for the stream, this difficulty is resolved in the PPDE equipment module.

The process for designing a process unit starts with user input of the data 14. The user input data comprises feed stream(s) (flow, composition and stream conditions), process model definition (unit operations listed with their inlet and outlet streams, key stream data such as separator pressures and column pressure profile with number of trays or packing stages), thermodynamic package/K-value methods, and other constraints as needed in conventional process simulation, together with project requirements, design criteria and/or site conditions. In some cases it is not necessary for the user to input all of the data required. That is, some of the input data may be gathered from a default set-up which embraces widely accepted engineering criteria and practices, such as rules for setting design margins for equipment design pressure and temperature, as well as widely used catalogue data, such as standard tube lengths and diameters for TEMA type heat exchangers, or flange rating tables for piping and valves. This information has only to be entered or edited once, and is then shared between all the engineering calculations. Catalogue type data is available for all projects.

A process simulation model 10 which is now integral with the PPDE modelling system then carries out heat and material balance calculations for the process unit in which flow conditions of mass flow, composition, molar vapour fraction, phase, pressure and temperature are determined, or specified as necessary, in each of the inlet and outlet streams for each of the unit operations. Moreover, critical properties and thermal/physical properties of the streams, which may comprise one or more of specific heat, latent heat, density, viscosity, thermal conductivity and surface tension are determined based on the flow conditions as in conventional process simulation.

A stream engineering properties module 42 of the PPDE system, then determines extended stream data, or stream engineering properties based on critical properties and/or thermal/physical properties of all the streams in the simulation model. For example, the stream engineering properties module determines the materials selection for streams taking account of the corrosion rate model appropriate for the type of process, the stream fouling factor (for shell and tube type heat exchangers), normalized Reynolds and Nusselt numbers (i.e. evaluated at a standard velocity and physical dimension), and normalized heater transfer coefficients for various heat transfer services (such as shell side and tube side coefficients for heat exchangers in single phase flow, or for condensers, or for plate type heat exchangers with high theta plates). The upstream and downstream unit operations are identified with each stream, and this forms the starting point for the full PPDE engineering model.

A preliminary engineering system 44 of the PPDE, then carries out the process and mechanical equipment design based on the materials of construction determined from the stream engineering properties, and the user selected equipment type, where manufacturing practicalities may override the preliminary material selection e.g. stainless steel may be used for the plates in plate heat exchangers. Such manufacturing preferences are entered in a separate table that is referred to in the material selection step. The list of unit operations has to be extended by inclusion of minor flowsheet items such as filters or filter-separators, and major equipment auxiliaries such as furnace fans and air preheaters, which require bulky ductwork. Minor utility lines such as furnace fuel gas and oil have to be added as well as pump and compressor recycle lines in order to achieve maximum modelling accuracy.

The equipment design comprises any of (1) determining mechanical design conditions, equipment size/dimensions, and number of duty and standby items, (2) thermal design of shell and tube and plate type heat exchangers with automatic selection of common TEMA types, tube length and diameter if shell & tube type has been selected, or common plate pattern, plate spacing and size if a plate type has been selected, (3) completing the mechanical equipment designs with dry and test weights, equipment elevations, associated platforms, major equipment auxiliaries, machinery shaft power and driver rating, and (4) the listing and sizing of main piping connections between unit operations, information which is needed for determining the number of levels and loads on the pipe rack. The preliminary engineering system 44 is configured to output sized equipment lists and data sheets 32.

Determining stream parameters such as the fouling factor, Prandtl Number, Reynolds Number, Nusselt Number or heat transfer coefficients, which are evaluated at a default diameter (e.g. 1" or 25 mm) and velocity (e.g. 1 m/s for liquid streams) for various applications, facilitates the sizing of heat exchangers outside the process simulation model 10, i.e. in the PPDE mathematical model and database. As a result, the consequences can be studied for the process unit as a whole for selecting a specific type of heat exchanger and its resulting size, something that is impossible with a conventional program arrangement, where the heat exchanger design is only integrated with the process simulator. One example is comparing the differing pump head and power, and overall process unit size, when the heat exchangers in a crude unit pre-heat train are changed from shell and tube to a welded plate type. In this case, the fouling factor is reduced by a factor of 10, if a plate type heat exchanger is selected.

This computer system is also applicable to fired heaters and their auxiliaries, such as furnace air-pre-heat fans and heat exchangers, so that fired heaters can also be studied as part of the process unit installation as a whole. In this case, combustion air/stack gas streams may be defined in the process simulator, and key furnace stream temperatures determined, e.g. by relating the convection bank gas temperature to the process inlet temperature to the fired heater, or by relating the stack exhaust temperature to the furnace efficiency.

Process simulation also identifies the unit operations needed for the process and the attached streams, which in effect connect the unit operations together. These connections become a means of communicating vital engineering information between successive unit operations and/or connections (i.e. streams or pipes).

A process layout module of the PPDE 46 then determines layout information based on the engineering information, setting out the equipment by type and/or in flowsheet order. The layout information comprises one or more of a footprint for each unit operation (equipment service), its elevation, which side of the pipe rack it is to be located, its sequencing, banking, stacking, automatic spacing, and the dimensions of the equipment footprint, pipe rack and its spurs, and paved areas. The process layout module is configured to calculate the overall area occupied by the process unit from the engineering information. The process layout module is configured to output an equipment location list with pipe rack loads 48.

A spinal pipe rack, i.e. a steel (or concrete) structure running across the unit for supporting process and utility piping within the process unit also carries the incoming and outgoing piping from the Battery Limit, which defines a unit boundary. The first step is to decide which side of the pipe rack the equipment is to be located, which is automated, and then to locate the equipment as far as possible in flowsheet order, a tactic that should minimise the interconnecting piping. This sequencing is described by three series of numbers, one for each side of the pipe rack, and one for air coolers, which are normally located on top of the pipe rack. These sequences are stored for each process model, and can be altered to test the advantages of different arrangements. Equipment may be double banked i.e. a vessel and its associated pump may occupy the same sequence position along the pipe rack, with one outboard. This facility may also be automated. Further, heat exchangers may be double banked with half the shells in a parallel row overhead.

Similarly, the side strippers in a crude distillation unit, or any other designated equipment, may be stacked one item above another. There is also a facility to locate spur racks as branches from the spinal rack, along which multiple sets of pumps (such as the pump around or product pumps in a crude distillation unit) may be arranged. Thus, various layout options can be studied at the process layout module 46, and a report containing the layout coordinates, pipe rack loads, and estimated resulting steel quantities is automatically updated for each option.

The second part as shown in FIG. 5b shows the more detailed design steps, where firstly the interconnections between unit operations are automatically routed in a line routing step carried out at a line routing module 50, based on a knowledge of their function or purpose, e.g. suction lines to pumps (and in some cases, compressors) and process lines to or from column reboilers are always directly routed, as are process interconnections between successive heat exchangers in a heat exchange train, whereas other process lines and utility headers run along the pipe rack. In the line routing step, the line routing module 50 i) identifies the purpose or function of each line, ii) determines whether the line is routed along pipe rack or directly point to point between two end points, and iii) determines the consequential pipe run and pressure drop for each section.

The routed interconnections allow hydraulic design and pressure profiles, e.g. the hydraulic system for each piping interconnection, to be determined in a hydraulic system module 52. The hydraulic system module 52 forms part of the preliminary engineering system and determines the pressure profile, and hence the pressure differential needed for pumps and compressors, and is configured to carry out one or more of identifying hydraulic systems, determining pressure profiles for each hydraulic systems, integrating with Battery Limits table, integrating with key process streams, determining pump, compressor, turbine and expander differentials, identifying the need for a flow meter or control valve for each pipe, and sizing of control valves. The output of the hydraulic system module 52 defines the mechanical design conditions 54, e.g. machinery design with driver/motor ratings and sets the pressure class for piping components 56, as the materials are known for each stream.

To understand what constitutes a hydraulic system, and its importance, a digression is necessary. The Battery Limits Table lists the process connections to and from other process units and the utility headers, and for each, the conditions of pressure and temperature at the connection to the main pipe rack outside the process unit. As a general principle, conditions for incoming lines are set upstream (e.g. the utilities are normally supplied plant wide from a central point), whereas conditions for outgoing process lines, and effluent streams such as flare and drain headers, are determined from within the process unit. Here, the calculated conditions from within the process unit are reported along with any initially assumed values, in order to identify potential conflicts or where a control valve might be required. This table and many process streams within the process unit contain information on stream pressure that is essentially fixed, and constrains the engineering design of the process unit.

Although much information on operating pressures within the process unit may be carried forward from the process simulation model 10, only part is essential for the process, and the rest is simply a first estimate or guess by the process engineer that is corrected during FEED. Thus the pressures at the top and bottom of a distillation column and in its reflux drum constitute essential information, as does the equilibrium pressure in any vessel where vapour is separated from liquid, as they affect stream compositions. By contrast, the pressures assumed in a process simulation at the discharge of a pump or compressor, or at a control valve (if it is modelled), are just estimates. Further, the pressures in a process simulation model relating to incoming and outgoing lines from the process unit battery limit may also be essential or just estimates. An hydraulic system may just comprise a vapour line from a process separator to a another vessel or compressor downstream, or the line from the battery limit to the crude feed pump in a crude distillation unit, or be a complex system starting from the feed pump discharge and may include a set of filters, multiple heat exchangers in series, a desalter vessel, and further heat exchangers until a flash drum is reached. In the first two cases, the upstream pressure provides a starting point for pressure drop calculations, whereas in the last case the so-called backpressure related to the downstream flash drum is the starting point, and the pressure is calculated in reverse, adding up the pressure losses, until the pump discharge is reached. Only then can the pressure class be correctly determined for the equipment items and piping components in the pump discharge line. The hydraulic system module provides a feedback loop for setting the correct equipment design pressures in the preliminary engineering system 44.

Once the pressure differential has been determined for a pump, compressor, turbine or expander, then the machine type, speed, impeller diameter, efficiency and shaft power can be determined in a machine design step 54. If a motor drive is required, the rated power and cable size are then determined 58. In the case of a compressor, turbine or expander, the suction or inlet volume also depends upon the pressure drop in the system, so the calculation of fluid density is itself affected by the pressure profile.

Identifying the hydraulic systems, determining which stream pressures are fixed and which are subject to change, determining the pressure profile for each system, and establishing the Battery Limits Table are skilled tasks carried out during FEED. These are all automatically determined in PPDE. Accurate hydraulic information is then used for the P&ID design functions previously described. More specifically, a P&ID design module 60 is configured to carry out P&ID design, comprising one or more of main pipe run from equipment coordinates and routing, main line sizing, number/size of piping leads, control valve (CV) installation (block, bypasses), transmitters, instruments, emergency shutdown valve (ESDV) and blow down valve (BDV) needs, I/O count for distributed control system (DCS), pressure safety valve (PSV) cases with flow data and sizing, as well as maintenance, e.g. block valves, spades, service connections, vents/drains. Therefrom, reports such as the equipment list, piping line list, the control valve and ESDV list 32, PSV list 32, as well as pipe run by size, material group and pipe schedule 62, piping valves by size, type, material group and class 66 and motor cable list 58 are all derived from hydraulically consistent data, and the accuracy of the material summaries is inherently improved. The determined size of the main piping interconnection between unit operations, or of the piping lead if there is more than one duty item, is a factor to be considered in setting the minimum elevation of an upstream item of equipment, so that its elevation is correctly calculated in the process layout module 46. For the suction vessel to a pump, the pump NPSH required may be the determining factor and the pressure drop in the suction line may be included in the calculation. The pipe size and NPSH are both communicated through the information channel formed between the connected unit operations.

All of the above applies equally to utility units such as boiler houses and power plants, effluent treatment plants and tank farms, although in these cases the pipe rack may be to one side of the unit or outside it altogether, features which are available in the PPDE computer system.

The modelling may run in Microsoft Excel and requires no special (i.e. non-commercial) software, or it may be run on any program known to the person skilled in the art. The user interface may be a spreadsheet, or it may be presented graphically.

Optionally, a commercial process simulator may be adapted to carry out the PPDE functions described herein.

Each stream interconnecting unit operations in the process flowsheet forms an information channel for the exchange of engineering information throughout the process flowsheet.

Optionally, the aforementioned stream interconnections become repositories for stream data, pipe engineering data, hydraulic information and process control information essential for the engineering design of the process unit.

Optionally, the unit operations become repositories for equipment engineering information essential for the engineering design of the process unit.

Embodiments of the present invention have been described. It will be appreciated that variations and modifications may be made to the described embodiments within the scope of the present invention.

The invention claimed is:

1. A computer system for designing a process unit, comprising:
   a computing device comprising a processor and a memory;
   machine-readable instructions stored in the memory that, when executed by the processor, cause the computing device to at least:
      simulate the process unit by modelling a set of unit operations interconnected by streams and flow conditions of each of the streams that interconnect the unit operations within the process unit, wherein physical properties for each of the streams are generated based at least in part on their respective generated flow conditions, wherein the modelling comprises creating a heat and material balance for said process unit;
      determine stream engineering properties of each of the streams based at least in part on their respective flow conditions and generated physical properties, wherein stream engineering properties define engineering requirements of each of the streams; and
      determine engineering information based at least in part on the determined stream engineering properties, physical properties of each of the streams and flow conditions of each of the streams, the engineering information comprising:
         equipment engineering data for each of the unit operations and
         pipe engineering data for each of the streams; and
   the process unit is designed based at least in part on interactively integrating the engineering information with the determined stream engineering properties, flow conditions and generated physical properties of the streams through information channels formed by each stream connection between a pair of unit operations.

2. The computer system of claim 1, the computer system further comprising an input defining one or more feed streams to the process unit, wherein the unit operations are connected to each other by one or more inlet streams and one or more outlet streams, and wherein the process unit processes the one or more feed streams to produce one or more product streams from the process unit.

3. The computer system of claim 1, the computer system further comprising:
   a store of unit operation models, wherein each of the unit operation models is formed by at least one equation for simulating the process unit;
   wherein the engineering information includes a number of operating items of equipment needed to meet an overall duty or requirements of each of the unit operations, or whether a standby item of equipment is required for any of the unit operations; and
   a store of engineering rules, wherein one or more of the engineering rules is applied to determine engineering information.

4. The computer system of claim 3, wherein the flow conditions and physical properties of the one or more outlet streams from the one or more inlet streams to each of the unit operations are determined based at least in part on their respective unit operation models from the store, wherein the respective one or more inlet streams to each of the unit operations are either the one or more feed streams or one or more output streams of a preceding unit operation in the process unit.

5. The computer system of claim 1, wherein the stream engineering properties comprise one or more of: corrosion rate model, requirements for material of construction, stream fouling factor, Reynolds number, Nusselt number, heat transfer coefficients, fluid hazard classification, or the identification of connected unit operations, so as to define engineering requirements in each of the streams.

6. The computer system of claim 1, wherein:
   the pipe engineering data determined from a preliminary engineering system defines attributes of a pipe conveying each of the streams; and
   the pipe engineering data takes account of a number of items of equipment, forming the unit operations connected upstream and downstream.

7. The computer system of claim 6, wherein the pipe engineering data comprises one or more of: pipe size, material of pipe construction, pipe wall thickness, piping pressure class, pipe routing, or coordinates of starting point and termination points for each of the pipes.

8. The computer system of claim 1, wherein the equipment engineering data determined from the preliminary engineering system comprises one or more of: equipment type, material of construction, equipment specification, heat exchanger designation, mechanical design conditions of pressure and temperature, mechanical design, listing and sizing of connections, major equipment auxiliaries, or number of operating and standby items of equipment required for each of the unit operations.

9. The computer system of claim 1, wherein the machine-readable instructions, when executed by the processor, further cause the computing device to at least:
   calculate a footprint or an elevation of each of the unit operations based at least in part on the engineering information, wherein the footprint takes account of the number of items of equipment and a location of each of the unit operations is based at least in part on with respect to a pipe rack of the process unit; and
   calculate the overall area occupied by the process unit from the engineering information.

10. The computer system of claim 9, wherein the machine-readable instructions, when executed by the processor, further cause the computing device to at least determine one or more layout sequences for the unit operations of the process unit.

11. The computer system of claim 9, wherein the machine-readable instructions, when executed by the processor, further cause the computing device to at least determine a piping route for each interconnecting pipe between unit operations, wherein the piping route is by a shortest distance, or along the pipe rack, within the process unit.

12. The computer system of claim 1, wherein:
   a flow condition of each of the streams comprises one or more of: mass flow rate, molar flow rate, volumetric flow rate, temperature, pressure, phase, or composition of the respective stream; and the physical properties comprise one or more of: specific heat, latent heat, density, viscosity, thermal conductivity, or surface tension of each of the streams.

13. The computer system of claim 1, wherein the process unit comprises one or more hydraulic systems each formed from one or more unit operations, and wherein the machine-readable instructions, when executed by the processor, further cause the computing device to at least to determine, for each of the hydraulic systems, a method of determining a hydraulic pressure profile.

14. The computer system of claim 13, wherein the method of determining the hydraulic pressure profile starts at a first unit operation and extends towards a last unit operation in each of the respective hydraulic systems.

15. The computer system of claim 13, wherein the method of determining the hydraulic pressure profile starts at the last unit operation and towards a first unit operation in each of the respective hydraulic systems.

16. The computer system of claim 13, wherein
the hydraulic pressure profiles of each of the hydraulic systems determine a differential pressure across each of the unit operations in the respective hydraulic system; and
the machine-readable instructions, when executed by the processor, further cause the computing device to at least determine engineering information based at least in part on the differential pressure across each of the unit operations.

17. A computer system for designing a process unit, comprising:
a computing device comprising a processor and a memory; machine-readable instructions stored in the memory that, when executed by the processor, cause the computing device to at least:
simulate the process unit by modelling a set of unit operations interconnected by streams and flow conditions of each of the streams that interconnect the unit operations within the process unit, wherein physical properties for each of the streams are generated based at least in part on their respective generated flow conditions;
determine stream engineering properties of each of the streams based at least in part on their respective flow conditions and generated physical properties, wherein stream engineering properties define engineering requirements of each of the streams; and
determine engineering information based at least in part on the determined stream engineering properties, physical properties of each of the streams and flow conditions of each of the streams, the engineering information comprising:
equipment engineering data for each of the unit operations and
pipe engineering data for each of the streams;
calculate a footprint or an elevation of each of the unit operations based at least in part on the engineering information, wherein the footprint takes account of a number of items of equipment and location of each of the unit operations is based at least in part on with respect to a pipe rack of the process unit;
calculate an overall area occupied by the process unit from the engineering information; and
the process unit is designed based at least in part on interactively integrating the engineering information with the determined stream engineering properties, flow conditions and generated physical properties of the streams through information channels formed by each stream connection between a pair of unit operations.

18. The computer system of claim 17, wherein the flow conditions and physical properties of one or more outlet streams from one or more inlet streams to each of the unit operations are determined based at least in part on their respective unit operation models from the store, wherein the respective one or more inlet streams to each of the unit operations are either the one or more feed streams to the process unit or one or more output streams of a preceding unit operation in the process unit.

19. A method for designing a process unit that comprises one or more hydraulic systems, each formed from one or more unit operations, comprising:
simulating the process unit by modelling a set of unit operations interconnected by streams and flow conditions of each of the streams that interconnect the unit operations within the process unit, wherein physical properties for each of the streams are generated based at least in part on their respective generated flow conditions;
determining stream engineering properties of each of the streams based at least in part on their respective flow conditions and generated physical properties, wherein stream engineering properties define engineering requirements of each of the streams; and
determining engineering information based at least in part on the determined stream engineering properties, physical properties of each of the streams and flow conditions of each of the streams, the engineering information comprising:
equipment engineering data for each of the unit operations and
pipe engineering data for each of the streams; and
interactively integrating the engineering information with the determined stream engineering properties, flow conditions and generated physical properties of the streams through information channels formed by each stream connection between a pair of unit operations;
determining, for each of the hydraulic systems, a method for determining a hydraulic pressure profile, wherein the hydraulic pressure profile for of each of the hydraulic systems determines a differential pressure across each of the unit operations in the respective hydraulic system; and
determining engineering information based at least in part on the differential pressure across each of the unit operations.

20. The method of claim 19, wherein the modelling comprises creating a heat and material balance for said process unit.

* * * * *